(12) United States Patent
Nishikawa et al.

(10) Patent No.: US 8,996,254 B2
(45) Date of Patent: Mar. 31, 2015

(54) VEHICLE STEERING CONTROL APPARATUS

(75) Inventors: Norihisa Nishikawa, Susono (JP); Mitsutaka Tanimoto, Susono (JP); Yoshitaka Fujita, Susono (JP); Toru Takashima, Susono (JP); Tetsuhiro Narita, Mishima (JP); Go Inoue, Susono (JP); Takahiro Kojo, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 79 days.

(21) Appl. No.: 13/991,083

(22) PCT Filed: Dec. 1, 2010

(86) PCT No.: PCT/JP2010/071511
§ 371 (c)(1),
(2), (4) Date: Jun. 12, 2013

(87) PCT Pub. No.: WO2012/073358
PCT Pub. Date: Jun. 7, 2012

(65) Prior Publication Data
US 2013/0253770 A1 Sep. 26, 2013

(51) Int. Cl.
*A01B 69/00* (2006.01)
*B60W 30/02* (2012.01)
(Continued)

(52) U.S. Cl.
CPC ............ *B60W 30/02* (2013.01); *B60W 50/035* (2013.01); *B60W 50/02* (2013.01); *B62D 6/003* (2013.01);
(Continued)

(58) Field of Classification Search
CPC . B60W 50/02; B60W 50/023; B60W 50/029; B60W 50/035; B60W 30/02; B60W 30/12; B60W 10/20

USPC ................... 701/41, 42, 43, 69; 180/443, 445; 303/122, 140, 146, 163
See application file for complete search history.

(56) References Cited

U.S. PATENT DOCUMENTS 6,648,426 B1 * 11/2003 Boettiger et al. ............. 303/146
2006/0025896 A1 2/2006 Traechtler et al.

FOREIGN PATENT DOCUMENTS

JP       6 336169        12/1994
JP       2006 36203        2/2006
(Continued)

OTHER PUBLICATIONS

International Search Report Issued Mar. 15, 2011 in PCT/JP10/71511 Filed Dec. 1, 2010.

*Primary Examiner* — Thomas Tarcza
*Assistant Examiner* — Kevin Myhre
(74) *Attorney, Agent, or Firm* — Oblon, Spivak, McClelland, Maier & Neustadt, L.L.P.

(57) ABSTRACT

A vehicle motion control apparatus which is configured to control a motion of a vehicle comprising a plurality of apparatuses, each of which is configured to selectively control a slip angle or a yaw rate, is provided with: a behavior controlling device which is configured to perform behavior control in which a plurality of apparatuses are controlled such that a slip angle and a yaw rate are a set target slip angle and a target yaw rate, respectively; a turning state quantity specifying device which is configured to specify a turning state quantity of the vehicle; and a selecting device which is configured to select at least one of the slip angle and the yaw rate to be prioritized, on the basis of the specified turning state quantity in a case where the behavior control needs to be performed by one of the plurality of apparatuses. The behavior controlling device controls the one apparatus such that the selected one has the target value corresponding to the selected one, in the case where the behavior control needs to be performed by the one apparatus.

19 Claims, 9 Drawing Sheets

(51) Int. Cl.
| | |
|---|---|
| *B60W 50/035* | (2012.01) |
| *B60W 50/02* | (2012.01) |
| *B62D 6/00* | (2006.01) |
| *B60W 10/18* | (2012.01) |
| *B60W 10/20* | (2006.01) |
| *B60W 30/045* | (2012.01) |
| *B60W 30/12* | (2006.01) |
| *B62D 7/15* | (2006.01) |
| *B62D 15/02* | (2006.01) |
| *B60W 50/023* | (2012.01) |
| *B60W 10/188* | (2012.01) |
| *B60W 50/00* | (2006.01) |

(52) U.S. Cl.
CPC ............... *B60W 10/18* (2013.01); *B60W 10/20* (2013.01); *B60W 30/045* (2013.01); *B60W 30/12* (2013.01); *B62D 7/159* (2013.01); *B62D 15/025* (2013.01); *B60W 50/023* (2013.01); *B60W 10/188* (2013.01); *B60W 2050/009* (2013.01); *B60W 2720/14* (2013.01); *B60W 2720/20* (2013.01); *B60W 2720/406* (2013.01)
USPC ............................................... 701/43; 701/41

(56) References Cited

FOREIGN PATENT DOCUMENTS

| | | |
|---|---|---|
| JP | 2008 126916 | 6/2008 |
| JP | 2009 274670 | 11/2009 |
| JP | 2010 23787 | 2/2010 |
| JP | 2010 23788 | 2/2010 |
| JP | 2010 188929 | 9/2010 |

* cited by examiner

VEHICLE STEERING CONTROL APPARATUS

TECHNICAL FIELD

The present invention relates to a vehicle motion control apparatus which can be applied to a vehicle provided with various automatic driving functions such as, for example, lane keeping assist (LKA).

BACKGROUND ART

As this type of apparatus, there is a vehicle motion control apparatus disclosed in Patent document 1. According to this apparatus, in a case where slip angle control and yaw moment control are performed by different apparatuses, if one of the apparatuses has broken down, the other apparatus performs control for compensating the broken-side control.

Incidentally, it is also proposed that in control for coordinating a vehicle behavior stabilization control device (VSA) and a rear-wheel tow angle control device (RTC), each of the VSA and the RTC performs the control on the basis of a yaw rate obtained from a coordinated control unit in the normal case of the coordinated control unit, and each of the VSA and the RTC performs the control on the basis of a yaw rate calculated within its own device in the abnormal case (refer to Patent document 2).

Moreover, it is also proposed that in the control for coordinating the VSA and the RTC, the coordinated control unit does not perform the coordinated control if the coordinated control unit has a defect, and each of the VSA and the RTC performs its own control operation (refer to Patent document 3).

There is also proposed an apparatus which is configured to coordinate intervention for stabilization between a vehicle dynamics control system and a rear axle steering system (e.g. refer to Patent document 4).

There is also proposed an apparatus which is configured to apply steering reaction force control in the case of an automatic steering mode using a gear ratio variable mechanism (e.g. refer to Patent document 5).

It is also proposed that in performing the coordinated control among electronic power steering (EPS), the VSA, and the RTC, when one of the plurality of vehicle control apparatuses stops the control due to abnormality of supply voltage, the other control apparatuses stop the coordinated control and perform the control of each device (refer to Patent document 6).

PRIOR ART DOCUMENT

Patent Document

Patent document 1: Japanese Patent Application Laid Open No. 2008-126916
Patent document 2: Japanese Patent Application Laid Open No. 2010-023787
Patent document 3: Japanese Patent Application Laid Open No. 2009-274670
Patent document 4: Japanese Patent Application Laid Open No. 2006-036203
Patent document 5: Japanese Patent Application Laid Open No. Hei 6-336169
Patent document 6: Japanese Patent Application Laid Open No. 2010-023788

SUMMARY OF INVENTION

Subject to be Solved by the Invention

In vehicle behavior control, there is a correlation between the number of state controlled variables and the number of degrees of freedom of vehicle state quantities. For example, if a slip angle and yaw moment are independently controlled, there are required two or more state controlled variables which can be independently controlled.

Here, the Patent document 1 discloses an apparatus configuration in which the slip angle control and the yaw moment control can be independently performed.

However, a failure of the one apparatus, as described in paragraph [0068], means a failure of one electronic control unit (ECU), and does not mean a failure of a mechanism which changes the state controlled variable (e.g. a steering angle) which promotes a change in the vehicle state quantities including the slip angle and the yaw moment. In other words, the apparatus disclosed in the Patent document 1 does not provide any solutions if the number of the independently controllable state controlled variables is reduced, for example, due to temporal or permanent malfunction of the apparatus or the like, or due to the other circumstances. In this regard, the same applies to the apparatuses disclosed in the Patent documents 2 and 3.

Therefore, in the case as described above, even if the technical ideas disclosed in those patent documents are applied, vehicle behavior is not always optimally controlled.

Moreover, as in the apparatus disclosed in the Patent documents 6, if the control of the vehicle state quantities is stopped upon occurrence of this type of situation for the reason of reduced control accuracy of the vehicle behavior, the stop may destabilize the control of the vehicle state quantities depending on a motion state of the vehicle at that time point.

On the other hand, the situation in which the number of the independently controllable state controlled variables is reduced as described above does not necessarily occur exclusively when the apparatus has broken down. For example, this type of situation temporarily occurs in some cases, for example, due to a temporal control load or heat load increase, or the like. In view of this, from the viewpoint of keeping the vehicle behavior optimal all the time, it is desirable that a clear control guideline to the case as described above is provided in advance.

As described above, the conventional technologies including the apparatus disclosed in the Patent documents 1 have such a technical problem that it is hard to optimize the vehicle behavior if the control needs to be performed by one apparatus, due to restriction of the function of apparatuses which physically promote a change in the state controlled variables or for similar reasons, in cases where the plurality of vehicle state quantities are independently controlled by the control of the plurality of state controlled variables having controllability.

In view of the aforementioned problems, it is therefore an object of the present invention to provide a vehicle motion control apparatus which is configured to maintain the optimal vehicle behavior as long as possible even if there arises a need to perform, by using one apparatus, the vehicle behavior control of the vehicle which uses a plurality of apparatuses which promote the change in the state controlled variables.

Means for Solving the Subject

The above object of the present invention can be achieved by a vehicle motion control apparatus which is configured to control a motion of a vehicle provided with a plurality of apparatuses, each of which is configured to selectively control a slip angle or a yaw rate, said vehicle motion control apparatus provided with: a target slip angle setting device which is configured to set a target slip angle as a target value of the slip angle; a target yaw rate setting device which is configured to set a target yaw rate as a target value of the yaw rate; a behavior controlling device which is configured to perform behavior control in which the plurality of apparatuses are controlled such that the slip angle and the yaw rate are the set target slip angle and the target yaw rate, respectively; a turning state quantity specifying device which is configured to specify a turning state quantity of the vehicle; and a selecting device which is configured to select at least one of the slip angle and the yaw rate to be prioritized, on the basis of the specified turning state quantity in a case where the behavior control needs to be performed by one of the plurality of apparatuses, wherein said behavior controlling device controls the one apparatus such that the selected one has the target value corresponding to the selected one, in the case where the behavior control needs to be performed by the one apparatus (claim 1).

The vehicle of the present invention is provided with the plurality of apparatuses, each of which is configured to selectively control the slip angle or the yaw rate, wherein the "slip angle" of the present invention means a vehicle body slip angle. In other words, the plurality of apparatuses include an apparatus which is configured to arbitrarily control one state controlled variable whose change promotes a change of one of vehicle state quantities including at least the slip angle and the yaw rate, for example, in the range of a physical, electrical, or mechanical restriction. Incidentally, the state controlled variable which can promote the change in the slip angle and the yaw rate means, for example, a front-wheel steering angle, a rear-wheel steering angle, a front-wheel braking/driving force difference or a rear-wheel braking/driving force difference, or the like, as a preferred form.

The vehicle motion control apparatus of the present invention is configured to control the vehicle provided with the plurality of apparatuses as described above, and can adopt forms of various computer systems or the like, such as, for example, various processing units like a single or a plurality of electronic control units (ECU), various controllers, or microcomputer apparatuses, which can include one or a plurality of central processing units (CPU), micro processing units (MPU), various processors, various controllers, or various memory devices, such as a read only memory (ROM), a random access memory (RAM), a buffer memory, or a flash memory, if necessary.

According to the vehicle motion control apparatus of the present invention, in its operation, the target slip angle is set by the target slip angle setting device, and the target yaw rate is set by the target yaw rate setting device. The target value set by each setting device may be, for example, a target value for making the vehicle follow a target driving route (e.g. LKA or the like corresponds to this type of control), as a preferred form. Conceptually, however, the target value set by each setting device may be a target set for any purpose.

If the target slip angle and the target yaw rate are set, the behavior control is performed by the behavior controlling device. The behavior control means control for realizing two-degree-of-freedom vehicle motion control, which is performed on the plurality of apparatuses such that the slip angle and the yaw rate have the set target values.

Further to that, each of the plurality of apparatuses is configured to control one state controlled variable, as described above, and the number of state controlled variables which can be controlled by independent control of the plurality of apparatuses is the number of the plurality of apparatuses. According to known vehicle motion equations, the number of the state controlled variables matches the degree of freedom of the vehicle state quantity, and thus, the control of the state controlled variables via the plurality of apparatuses enables the two-degree-of-freedom vehicle motion which independently controls the two types of vehicle state quantities which are the slip angle and the yaw rate. Incidentally, considering that it is possible to ensure the degree of freedom of the motion which matches the number of the plurality of apparatuses, obviously, the behavior control is control for realizing at least the two-degree-of-freedom vehicle motion in a more strict sense.

At this time, the target values of the state controlled variables for realizing the target slip angle and the target yaw rate can be obtained, for example, by numerically solving a vehicle motion model which is established on the basis of the vehicle motion equations or by performing similar actions. Alternatively, if the target values obtained in the above manner are mapped in advance, the target values can be obtained by appropriately selecting relevant values or by performing similar actions.

On the other hand, in the process of performing this type of behavior control, there is a case where the behavior control needs to be performed by one of the plurality of apparatuses, regardless of whether or not it can be foreseen, or whether or not the cause is clear. There are various reasons why such a situation occurs, and the reason is not uniquely limited. In any case, in the case where the behavior control needs to be performed by the one apparatus as described above, the two-degree-of-freedom vehicle motion control cannot be performed. In such a situation, if the state controlled variables when the plurality of apparatuses are used are maintained without change, the slip and the yaw rate likely deviate from desired values due to an influence of the state controlled variable which has lost controllability and which is associated with the apparatus that is not used for some reasons.

By the way, various situations in which it is determined that the behavior control needs to be performed by the one apparatus can occur independently of the vehicle behavior at that time point. Thus, if the behavior control is forcibly or discontinuously ended on the basis of the fact that the behavior control needs to be performed by the one apparatus, it is obvious that it has an adverse effect on the vehicle behavior to no small extent.

Therefore, in the case where there arises the need, whether or not the behavior control is eventually ended, or whether or not elimination of the need is waited for, it is desirable to take a provisional, alternative, or second best measure so as not to destabilize the vehicle behavior, in the above type of transitional period.

Conventionally, however, the measure which takes into account the influence on the vehicle behavior in the transitional period was not considered, and there was no clear guideline. The vehicle motion control apparatus of the present invention provides a clear guideline in performing the provisional, alternative, or second best measure if it is hard to maintain at least the two-degree-of-freedom vehicle motion control including the slip angle and the yaw rate as a control target, which is originally desired.

In other words, according to the vehicle motion control apparatus of the present invention, the turning state quantity specifying device specifies the turning state quantity of the vehicle, and the selecting device selects one of the slip angle and the yaw rate to be prioritized, on the basis of the specified turning state quantity. The aforementioned behavior controlling device controls the one apparatus such that the selected one has the selected target value. Incidentally, the term "specify" of the present invention means to make a determination to use what is specified as a reference value in terms of control in the end, and a practical aspect thereof may widely range, such as detect, calculate, derive, estimate, identify, select, or obtain.

The turning state quantity is a state quantity which is an index for defining turning behavior at that time point in the process of the behavior control of the present invention including the two-degree-of-freedom vehicle motion control in which the slip angle and the yaw rate are the control target. On the other hand, the yaw rate out of the vehicle state quantities is a vehicle state quantity suitable for the control of the turning behavior in comparison with the slip angle. Therefore, by using the turning behavior as a determination criterion, it is possible to accurately select the vehicle state quantity in which the controllability is required preferentially at that time point out of the slip angle and the yaw rate. For example, qualitatively speaking, it can be determined that a turning state is to be prioritized in the case of the turning of the vehicle and that a straight-travel state is to be prioritized in the case of straight travel. Incidentally, it is obvious that the behavior controlling device newly determines a control target of the vehicle state quantity, as occasion demands, on the basis of the selected vehicle state quantity to be to prioritized and the target value thereof, and performs actual control.

Incidentally, the expression "to be prioritized" preferably includes a binary prioritization aspect in which one vehicle state quantity is selected and the other vehicle state quantity is not selected, and can include a gradual or continuous prioritization aspect in which a control ratio of the one vehicle state quantity (which may be incidentally a ratio of control time in a predetermined period or the like in this case because the degree of freedom of the motion is one degree of freedom) is weighted.

As described above, according to the vehicle motion control apparatus of the present invention, the selecting device selects the one vehicle state quantity to be prioritized out of the slip angle and the yaw rate while using the turning state quantity as a selection criterion, and the control of the selected one is prioritized. Thus, even if the behavior control needs to be performed by one of the plurality of apparatuses, it is possible to end the behavior control so as not to have an adverse effect on the vehicle behavior while continuing one-degree-of-freedom vehicle motion control for the vehicle state quantity to be prioritized at that time point, by effectively using one degree of freedom provided for the vehicle motion, as the provisional, alternative, or second best measure until the behavior control is to be ended. Alternatively, it is also possible to wait for the return of the plurality of apparatuses (or one more apparatus if the degree of freedom is provided at least for the slip angle and the yaw rate) in the period of continuously taking the measure. In any case, even if the behavior control needs to be performed by the one apparatus, the optimal vehicle behavior can be maintained as long as possible.

In one aspect of the vehicle motion control apparatus of the present invention, the plurality of apparatuses include a first apparatus and a second apparatus, each of which is configured to selectively control the slip angle or the yaw rate, said vehicle motion control apparatus is further provided with a function restricted state determining device which is configured to determine whether or not at least one of the first and second apparatuses is in a function restricted state, said selecting device selects the one to be prioritized in a case where it is determined that the first or second apparatus is in the function restricted state, as the case where the behavior control needs to be performed by the one apparatus, and said behavior controlling device controls one of the first and second apparatuses which is not in the function restricted state, as the one apparatus, such that the selected one has the target value corresponding to the selected one (claim 2).

According to this aspect, the plurality of apparatuses include the first and second apparatuses, as apparatuses which realize independent control of the slip angle and the yaw rate associated with the behavior control, via the control of the state controlled variables, as a preferred form. In this aspect, the "case where the behavior control needs to be performed by the one apparatus" of the present invention is defined as a case where one of the first and second apparatuses is in the function restricted state.

Here, the "function restricted state" is a concept widely including a state in which a function to be originally expected is restricted regardless of permanently or temporarily, or regardless of degree of the restriction. The case where the apparatus is in the function restricted state can include, for example, a case where a part or all of the apparatus has broken down, a case where a part of all of the apparatus has an abnormality or failure, a case where a load state (processing load, electrical load, heat load, etc.) of the apparatus falls into an excessive load state temporarily or permanently, or similar cases.

Whether or not one of the first and second apparatuses is in the function restricted state is determined by the function restricted state determining device which is configured to determine whether or not at least one of the first and second apparatuses is in the function restricted state. At this time, the function restricted state determining device can perform the determination without delay, for example, on the basis of a change of the actual state controlled variable for a controlled variable change which promotes a change of the state controlled variable, a change of a selectable area of the controlled variable which promotes a change of the state controlled variable, degree of a processing load, a change in an operating environment, or the like.

According to this aspect, if the one apparatus falls into the function restricted state as described above, it is possible to keep the vehicle behavior optimal as long as possible and to suppress the destabilization of the vehicle behavior.

In another aspect of the vehicle motion control apparatus of the present invention, the first apparatus is a front-wheel steering angle varying apparatus which is configured to change a front-wheel steering angle, independently of a driver's operation which promotes a change in the front-wheel steering angle, and the second apparatus is a rear-wheel steering angle varying apparatus which is configured to change a rear-wheel steering angle, independently of a driver's operation which promotes a change in the rear-wheel steering angle (claim 3).

The front-wheel and rear-wheel steering angle varying apparatuses are configured to change the front-wheel and rear-wheel steering angles, independently of the driver's operation which promotes the change in the front-wheel and rear-wheel steering angles, respectively. The driver's operation means the operation of various steering input devices, preferably such as a steering wheel. Therefore, according to the front-wheel and rear-wheel steering angle varying apparatuses, even if a driver loses hold of the steering wheel or only holds the steering, the steering angles described above can be changed to have desired values.

In other words, the front-wheel and rear-wheel steering angle varying apparatuses are different, in an essential meaning, from a normal steering mechanism which has a mechanical transmission path of a steering input from the various steering input devices to steered wheels (preferably, front wheels). From the viewpoint of a physical configuration, at least one portion of the front-wheel and rear-wheel steering angle varying apparatuses may be commonly used or shared with this type of steering mechanism. The front-wheel steering angle varying apparatus may be variable gear ratio steering (VGRS) as a preferred form, and the rear-wheel steering angle varying apparatus may be active rear steering (ARS) as a preferred form.

The front-wheel and rear-wheel steering angle varying apparatuses are can change the front-wheel steering angle and the rear-wheel steering angle, respectively, which are the state controlled variables, at least in a certain range, with respect to the wheels targeted for steering angle control. Thus, theoretically, a direction of travel of the vehicle can be changed independently of the driver's steering input. The front-wheel and rear-wheel steering angle varying apparatuses are preferable as apparatuses which promote the change in the vehicle state quantities including the slip angle and the yaw rate.

In another aspect of the vehicle motion control apparatus of the present invention, the plurality of apparatuses further include a third apparatus which is different from the first and second apparatus, each of which is configured to selectively control the slip angle or the yaw rate, and said behavior controlling device controls the third apparatus such that the selected one has the target value corresponding to the selected one if both the first and second apparatuses are in the function restricted state (claim 4).

According to this aspect, the vehicle is provided with the third apparatus which is different from the first and second apparatus, and the third apparatus is controlled by the behavior controlling device if it is determined by the function restricted state determining device that both the first and second apparatuses are in the function restricted state. Therefore, even if both the first and second apparatuses are in the function restricted state, the one-degree-of-freedom vehicle motion control can be performed, which is practically useful.

Incidentally, in this aspect, the third apparatus may be a braking/driving force varying apparatus which is configured to change a front-wheel or rear-wheel left-right braking/driving force difference (claim 5).

The braking/driving force varying apparatus is configured to change the front-wheel and/or rear-wheel left-right braking/driving force difference (a difference in the braking/driving force between left and right wheels). The braking/driving force varying apparatus can adopt, as a preferred form, for example, practical aspects of either one or both of various driving force varying apparatuses including a driving force distributing differential mechanism, an in-wheel motor system, or the like, and various braking force varying apparatuses including various electronic controlled braking systems (ECBs) or the like including an antilock braking system (ABS) or the like. Incidentally, the expression "... configured to change the left-right braking/driving force difference" namely means that "the braking/driving force of the left and right wheels can be changed independently of each other" in an unambiguous manner.

If the braking/driving force varying apparatus is a driving force varying apparatus, torque supplied from various power sources such as, for example, an internal combustion engine (incidentally, torque and a driving force can have an unambiguous relation) is distributed to the front and rear wheels at a fixed or variable distribution ratio, and then, the torque distributed to each of the front and rear wheels is further distributed to the left and right wheels at a desired distribution ratio. As a result, an increase or decrease in absolute values of the driving forces of the left and right wheels is controlled, and the left-right driving force difference can be thus generated. Alternatively, for example, driving forces independent of engine torque are applied to the left and right wheels, and the increase or decrease control of the absolute values of the left and right wheels can result in the left-right driving force difference.

Moreover, if the braking/driving force varying apparatus is a braking force varying apparatus, braking forces, preferably as friction braking forces applied to the left and right wheels, are varied. This can provide the same effect as relatively increasing the driving force, for the wheel on the side where a smaller braking force is applied. In other words, the braking force is a so-called negative driving force.

In any case, if there is the braking/driving force difference between the left and right wheels, the vehicle turns to the side of the wheel having a relatively small driving force (i.e. the wheel having a relatively large braking force) (i.e. to the right side if the driving force (or braking force) on the right wheel side is small (or large)). Therefore, according to the braking/driving force varying apparatus, theoretically, the direction of travel of the vehicle can be changed independently of the driver's steering input. In other words, the braking/driving force varying apparatus is also preferable as the apparatus which promotes the change in the slip angle and the yaw rate.

In another aspect of the vehicle motion control apparatus of the present invention, the function restricted state includes at least one of a failure state and a state in which selection of controlled variables is restricted (claim 6).

If at least one of the first and second apparatuses is broken, or if the selection of the controlled variables is restricted, a situation in which two degrees of freedom cannot be ensured as the degree of freedom in terms of the vehicle motion control continues over a long period of time which cannot be ignored. Therefore, in the case as described above, the effect of the vehicle motion control apparatus of the present invention is relatively clear.

In another aspect of the vehicle motion control apparatus of the present invention, said specifying device specifies degree of turning of the vehicle as the turning state quantity (claim 7).

The degree of turning is a numerical index which can indicate the turning state, gradually or continuously, and is preferable as the turning state quantity. Incidentally, the degree of turning may be, for example, a yaw rate (as it increases, the degree of turning increases), a radius of a driving route (as it decreases, the degree of turning increases), or lateral acceleration (as it increases, the degree of turning increases).

Incidentally, in this aspect, said selecting device may select the yaw rate as the one to be prioritized if the specified degree of turning is greater than or equal to a reference value, and may select the slip angle as the one to be prioritized if the specified degree of turning is less than the reference value (claim 8).

In this case, the selecting device uses the reference value as a boundary value and selects either one of the vehicle state quantities in a binary manner as the vehicle state quantity to be prioritized. Qualitatively, the yaw rate is selected if the vehicle is in the turning state, and the slip angle is selected if the vehicle is in the straight travel state, as the vehicle state quantity to be prioritized. Therefore, it is possible to reduce a control load while ensuring the effect of the present invention in which the optimal vehicle behavior is maintained as long as possible.

In another aspect of the vehicle motion control apparatus of the present invention, said specifying device specifies a change rate of degree of turning of the vehicle as the turning state quantity (claim 9).

The change rate of degree of turning is an amount of time change of the degree of turning. For example, if the degree of turning is the yaw rate, the change rate of degree of turning is an amount of time change of the yaw rate.

For example, if the vehicle tries to avoid an obstacle ahead (so-called urgent avoidance operation) or in similar cases, even though the degree of turning is small, an amount of change thereof instantaneously increases in some cases. In other words, the change rate of degree of turning can accurately define one portion of the vehicle behavior which cannot be defined only by the degree of turning. Therefore, by using the change rate of degree of turning alone or with the degree of turning as a determination criterion, the effect of the present invention in which the optimal vehicle behavior is maintained as long as possible can be obtained, relatively simply.

Incidentally, in this aspect, said selecting device may select the yaw rate as the one to be prioritized if the specified change rate of degree of turning is greater than or equal to a reference value, and may select the slip angle as the one to be prioritized if the specified change rate of degree of turning is less than the reference value (claim 10).

In this case, the selecting device uses the reference value as the boundary value and selects either one of the vehicle state quantities in a binary manner as the vehicle state quantity to be prioritized. Qualitatively, the yaw rate is selected if the vehicle suddenly turns, and the slip angle is selected in other cases, as the vehicle state quantity to be prioritized. Therefore, it is possible to reduce the control load while ensuring the effect of the present invention in which the optimal vehicle behavior is maintained as long as possible.

In another aspect of the vehicle motion control apparatus of the present invention, said specifying device specifies a steering characteristic of the vehicle as the turning state quantity (claim 11).

The steering characteristic of the vehicle is namely a characteristic of a trajectory with respect to a clearly set or imaginary target driving route. Qualitatively, the steering characteristic is specified as neutral-steering if the target driving route is traced, as over-steering if an actual turning radius is less than the target driving route, and as under-steering if the actual turning radius is greater than the target driving route. If the steering characteristic differs, the vehicle behavior also differs. Thus, this type of steering characteristic is also useful information to select one of the slip angle and the yaw rate, or the control ratio thereof.

Incidentally, in this aspect, said selecting device may select the yaw rate as the one to be prioritized if the specified steering characteristic corresponds to a strong under-steering state, and may select the slip angle as the one to be prioritized if the specified steering characteristic does not correspond to the strong under-steering state (claim 12).

The strong under-steering state is a state in which a driving radius of the vehicle significantly deviates outward with respect to the clearly set or imaginary target driving route, and is preferable as a situation in which the control of the yaw rate is to be prioritized. Incidentally, whether or not the steering characteristic corresponds to the strong under-steering state can be determined, for example, by arithmetic processing based on the radius of the driving route, the lateral acceleration, or the like, or other known methods can be also adopted.

In another aspect of the vehicle motion control apparatus of the present invention, it is further provided with a stability state quantity specifying device which is configured to specify a stability state quantity for defining degree of stability of vehicle behavior, and said selecting device selects the one to be prioritized on the basis of the specified stability sate quantity, in preference to the selection based on the turning state quantity (claim 13).

According to this aspect, the stability state quantity for defining the degree of stability of the vehicle behavior is specified. Although the stability state quantity is the vehicle state quantity as in the aforementioned turning state quantity, the stability state quantity is a state quantity for defining whether or not the vehicle behavior is stable at that time point or how stable it is, whether or not the vehicle behavior is easily stabilized or how easily it is stabilized, or the like. The stability state quantity can be changed with turning operation; however, the stability state quantity itself does not define the turning operation.

Here, according to this aspect, the selecting device prioritizes the selection of the vehicle state quantity based on the stability state quantity over the selection based on the turning state quantity. Therefore, it is possible to further emphasize the stabilization of the vehicle behavior, thereby improving safety of the vehicle as much as possible.

Incidentally, in this aspect, said stability state quantity specifying device may specify the slip angle as the stability state quantity, and said selecting device may select the slip angle as the one to be prioritized if the specified slip angle is greater than or equal to a reference value (claim 14).

The slip angle is an angle with respect to a turning tangential direction of the vehicle and is an angle between the direction of a vehicle body and the instantaneous direction of travel of the vehicle body. Thus, the slip angle is useful as an index for understanding the degree of stability of the vehicle behavior. In particular, according to this aspect, if the slip angle is large, the control of the slip angle is prioritized as the one-degree-of-freedom motion control. Therefore, the vehicle behavior can be maintained in an optimal state as long as possible.

Moreover, in this aspect, said stability state quantity specifying device may specify degree of friction of a driving route as the stability state quantity, and said selecting device may select the slip angle as the one to be prioritized if the specified degree of friction is less than a reference value (claim 15).

If the driving route is slippery, the vehicle behavior tends to be unstable (and slip angle violent fluctuations can also occur). Thus, the degree of friction of the driving route, simply a friction coefficient, influences the degree of stability of the vehicle behavior from a current time point to a near-future. In particular, according to this aspect, if the degree of friction is less than the reference value, the control of the slip angle is prioritized as the one-degree-of-freedom motion control. Therefore, the vehicle behavior can be maintained in the optimal state as long as possible.

In another aspect of the vehicle motion control apparatus of the present invention, said target slip angle setting device sets the target slip angle such that the vehicle follows a target driving route, said target yaw rate setting device sets the target yaw rate such that the vehicle follows the target driving route, said behavior controlling device performs, as the behavior control, trajectory following control in which the plurality of apparatuses are controlled such that the slip angle and the yaw rate are the target slip angle and the target yaw rate, respectively, each of which is set to follow the target driving route, and the vehicle is further provided with a steering reaction force control apparatus which is configured to control a steering reaction force, the vehicle motion control apparatus is further provided with: a target steering reaction force setting device which is configured to set a target steering reaction force as a target value of the steering reaction force; and a coordinated control performing device which is configured to perform coordinated control in which the steering reaction force control apparatus is controlled such that the steering reaction force is the set target steering reaction force, cooperatively with the trajectory following control, said behavior controlling device continues the trajectory following control by controlling the one apparatus such that the selected one has the target value to corresponding to the selected one, in the case where the behavior control needs to be performed by the one apparatus, and said coordinated control performing device continues the coordinated control in a period in which the trajectory following control is continued (claim 16).

According to this aspect, the target yaw rate and the target slip angle are set for the purpose of the trajectory following control, such as, for example, LKA. In other words, the vehicle can ideally follow the target driving route by the control of the yaw rate and the slip angle performed by the behavior controlling device.

On the other hand, if a type of automatic steering realized and the two-degree-of-freedom vehicle motion is realized by controlling the vehicle state quantities including the slip angle and the yaw rate to have the target values set by the respective target value setting devices, then, steering reaction torque represented, for example, by self-aligning torque of the steered wheels or the like can act on a steering apparatus as a steering input transmitting device for the steered wheels, which includes a steering input device, such as a steering wheel, and a steering mechanism.

The steering reaction torque can be a so-called "response" of the steering if the driver applies a steering holding force to the steering input device. However, the vehicle motion control for a target vehicle motion is a type of automatic steering which can be performed independently of the driver's steering intention (of course, the control itself may be started due to the driver's intention). Thus, the steering reaction torque easily makes the driver feel uncomfortable. Moreover, the steering reaction torque is reaction torque which is to rotate the steering input device in a direction opposite to the original turning direction. Thus, in so-called hands-free driving in which the driver does not apply the steering holding force, the turn of the steering input device in the opposite turning direction can influence the vehicle motion control. More specifically, unless some measures are taken, the influence of the reaction torque makes it difficult to realize the automatic steering.

According to this aspect, the vehicle is provided with the steering reaction force control apparatus, such as electronic power steering (EPS), which is configured to control this type of steering reaction force. The steering reaction force control apparatus is controlled such that the steering reaction force is the target steering reaction force set by the target steering reaction force setting device (which is substantially a value corresponding to zero if the hands-free driving is realized). At this time, the steering reaction force control apparatus is controlled by the coordinated control performing device to be coordinated with the trajectory following control for following to the target driving route.

If, for example, assist steering torque or the like by the steering reaction force control apparatus is treated as a type of state to controlled variable, the degree of freedom in terms of the vehicle motion control is three degree of freedom in the coordinated control between the steering reaction force control and the trajectory following control as the behavior control, and it is possible to maintain or converge the steering reaction force at or to a desired (i.e. target) steering reaction force, in addition to the slip angle and the yaw rate. The coordinated control is namely control for maintaining the steering reaction force, which is generated in the process of performing the trajectory following control using the yaw rate and the slip angle, at the target steering reaction force (preferably, to suppress it to zero).

In the case where the first or second apparatus is in the function restricted state in the process of performing the coordinated control as described above, if the coordinated control is forcibly ended, the vehicle behavior remarkably tends to become unstable in view of an influence of the steering reaction force on the driver's steering operation. Thus, according to this aspect, the behavior controlling device changes the state controlled variable of one apparatus which performs the trajectory following control, as occasion demands, on the basis of the slip angle or the yaw rate selected by the selecting device, and continues the one-degree-of-freedom trajectory following control. Along with that, the coordinated control performing device also continues the coordinated control associated with the steering reaction force. Therefore, the optimal vehicle behavior can be maintained as long as possible.

In one aspect of the vehicle motion control apparatus of the present invention in which said coordinated control is performed, it is further provided with an allowable condition determining device which is configured to determine whether or not a state of the vehicle corresponds to an allowable condition which is set t allow an end of the coordinated control in the period in which the coordinated control is continued, said behavior controlling device ends the trajectory following control if it is determined that the state of the vehicle corresponds to the allowable condition, and said coordinated control performing device ends the coordinated control if it is determined that the state of the vehicle corresponds to the allowable condition (claim 17).

According to this aspect, it is determined by the allowable condition determining device that the state of the vehicle corresponds to the allowable condition. Here, the "allowable condition" is a condition for ending the coordinated control. To put it differently, the allowable condition indicates a condition in which it is definite that even the end of the coordinated control does not cause the destabilization of the vehicle behavior in practice, on the basis of experiments, experiences, theories, simulations or the like.

According to this aspect, the coordinated control performing device ends the coordinated control if it is determined that the state of the vehicle corresponds to the allowable condition. Therefore, it is possible to prevent the destabilization of the vehicle behavior which can occur if the vehicle behavior at that time point is ended without consideration or in similar cases.

Incidentally, in this aspect, the allowable condition may include a stop of the vehicle (claim 18).

If the vehicle is stopped, even though the coordinated control is ended, there is no significant influence on the vehicle behavior. Thus, whether or not the vehicle is stopped is preferable as the allowable condition of the present invention.

In another aspect of the vehicle motion control apparatus of the present invention in which said coordinated control is performed, it is further provided with a notifying device which is configured to notify a driver that the behavior control needs to be performed by the one apparatus if the trajectory following control and the coordinated control are ended (claim 19).

According to this aspect, the driver is notified that the behavior control needs to be performed by one of the plurality of apparatuses, via various exclusive or general multi information lamps (MIL), various function displays, or the like. Therefore, it is possible to encourage the driver to perform safe driving, and it is useful from the viewpoint of enabling the vehicle to drive more safely.

The operation and other advantages of the present invention will become more apparent from embodiments explained below.

MODES FOR CARRYING OUT THE INVENTION

<Embodiments of the Invention>

Hereinafter, various embodiments of the vehicle motion control apparatus of the present invention will be explained with reference to the drawings, as occasion demands.

<1: First Embodiment>

<1-1: Configuration of Embodiment>

Figure 1:
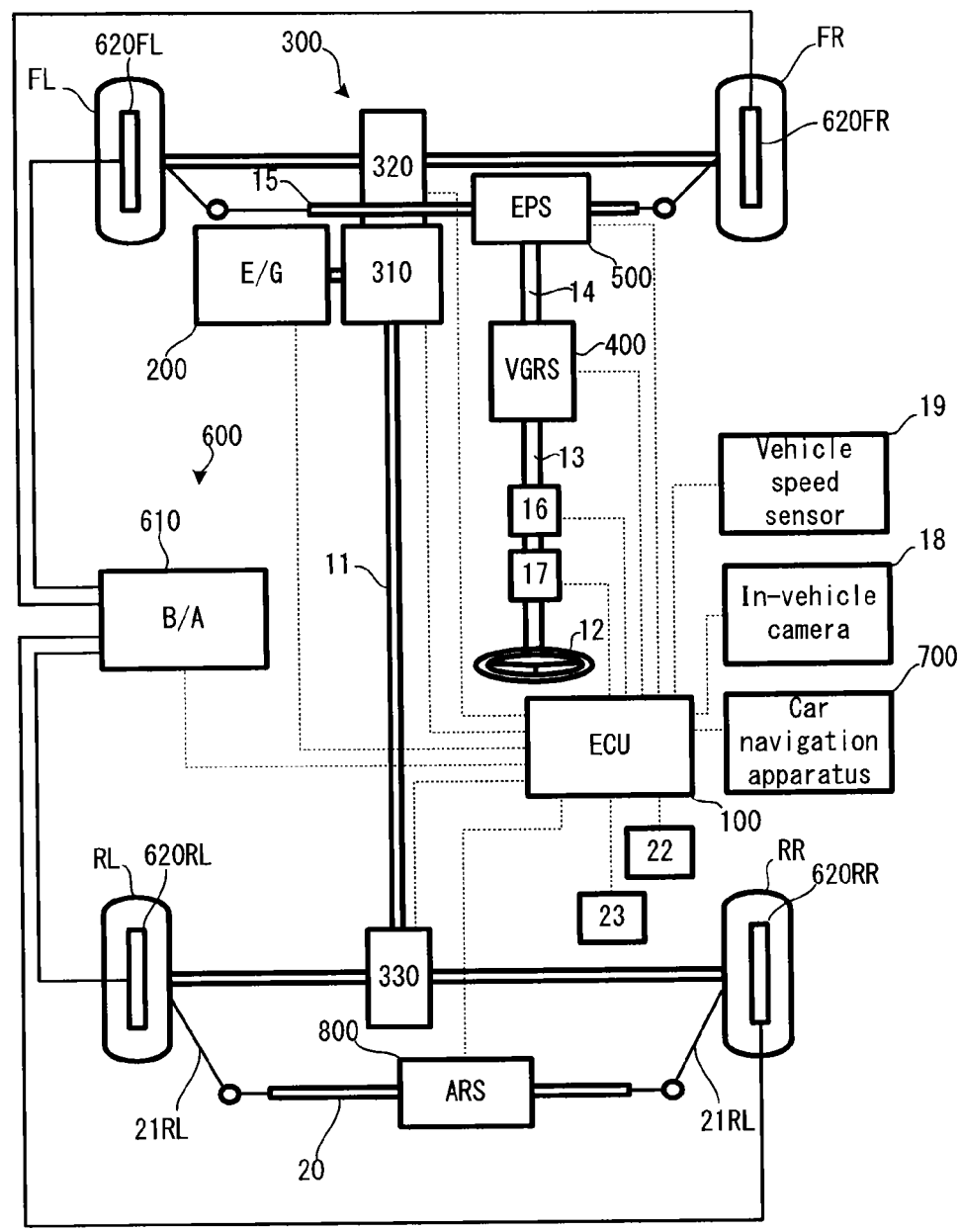
FIG. 1 is a schematic configuration diagram conceptually illustrating a configuration of a vehicle in a first embodiment of the present invention.

Firstly, with reference to FIG. 1, a configuration of a vehicle 10 in a first embodiment of the present invention will be explained. FIG. 1 is a schematic configuration diagram conceptually illustrating a basic configuration of the vehicle 10.

In FIG. 1, the vehicle 10 is provided with a left front wheel FL, a right front wheel FR, a left rear wheel RL and a right rear wheel RR. The vehicle 10 is configured to move in a desired direction by a steering angle change of the left front wheel FL and the right front wheel FR, which are steered wheels, and a steering angle change of the left rear wheel RL and the right rear wheel RR.

The vehicle 10 is provided with an ECU 100, an engine 200, a driving force distributing apparatus 300, a VGRS actuator 400, and EPS actuator 500, an electronic controlled braking system (ECB) 600, a car navigation apparatus 700, and an ARS actuator 800.

The ECU 100 is provided with a central processing unit (CPU), a read only memory (ROM), and a random access memory (RAM), each of which is not illustrated, and it is an electronic control unit which is configured to control the entire operation of the vehicle 10. The ECU 100 is one example of the "vehicle motion control apparatus" of the present invention. The ECU 100 is configured to perform LKA control and fail-safe control described later, in accordance with a control program stored in the ROM.

Incidentally, the ECU 100 is an integrated electronic control unit which is configured to function as one example of each of the "target yaw rate setting device", the "target slip angle setting device", the "behavior controlling device", the "function restricted state determining device", the "selecting device", the "stability state quantity specifying device", the "target steering reaction force setting device", the "coordinated control performing device", the "allowable condition determining device" and the "notifying device" of the present invention, and the operation of each of the devices is performed by the ECU 100. However, the physical, mechanical, and electrical configurations of each of the devices of the present invention are not limited to this example, and for example, each of the devices may be configured as various computer systems or the like, such as a plurality of ECUs, various processing units, various controllers, or microcomputer apparatuses.

The engine 200 is a power source of the vehicle 10.

Incidentally, the power source of the vehicle of the present invention is not limited to an internal combustion engine having various practical aspects as a concept including an engine which is configured to convert fuel combustion to mechanical power and extract it (the engine 200 is also one example thereof), and may be a rotating electrical machine such as a motor. Alternatively, the vehicle may be a so-called hybrid vehicle in which they are cooperatively controlled. A crankshaft, which is a driving force output shaft of the engine 200, is connected to a center differential apparatus 310 which is one constituent of the driving force distributing apparatus. Incidentally, the detailed configuration of the engine 200 correlates weakly with the subject matter of the present invention, and the details will be thus omitted herein.

The driving force distributing apparatus 300 is one example of the "braking/driving force varying apparatus" of the present invention which is configured to distribute engine torque Te transmitted via the crankshaft from the engine 200, to the front wheels and the rear wheels at a predetermined ratio, and which is further configured to change driving force distribution of the left and right wheels in each of the front wheels and the rear wheels. The driving force distributing apparatus 300 is provided with a center differential apparatus 310 (hereinafter referred to as a "center differential 310"), a front differential apparatus 320 (hereinafter referred to as a "front differential 320"), and a rear differential apparatus 330 (hereinafter referred to as a "rear differential 330").

The center differential 310 is a limited slip differential (LSD: a differential mechanism with a differential limiting function) which is configured to distribute the engine torque supplied from the engine 200, to the front differential 320 and the rear differential 330. The center differential 310 distributes the engine torque Te to the front and rear wheels at a distribution ratio of (as one example but not limited to) 50:50 under the condition that a load acting on the front and rear wheels is substantially constant. Moreover, if a rotational speed of either one of the front and rear wheels is higher than that of the other, differential limit is performed such that differential limiting torque acts on the one wheels and the torque is transferred to the other wheels. In other words, the center differential 310 is a so-called rotational-speed-sensing (viscous coupling) differential mechanism.

Incidentally, the center differential 310 is not limited to such a rotational-speed-sensing differential mechanism, but may be a torque-sensing differential mechanism in which a differential limiting action increases in proportion to input torque. Moreover, it may be a distribution-ratio-variable differential mechanism in which a differential action is exerted by a planetary gear mechanism, in which the differential limiting torque is continuously changed by on-off control of an electromagnetic clutch, and in which a desired distribution ratio can be realized within a predetermined adjustable range. In any case, the center differential 310 may adopt various practical aspects regardless of being publicly known or unknown, as long as it can distribute the engine torque Te to the front wheels and the rear wheels.

The front differential 320 is a distribution-ratio-variable LSD which is configured to distribute the engine torque Te distributed to the side of a front axle (front wheel axle) by the center differential 310, further to the left and right wheels at a desired distribution ratio set within a predetermined adjustable range. The front differential 320 is provided with: a planetary gear mechanism including a ring gear, a sun gear, and a pinion carrier; and an electromagnetic clutch for providing differential limiting torque. With the ring gear of the planetary gear mechanism, a differential case is coupled. With the sun gear and the carrier, the axle is coupled on either side. Moreover, the differential limiting torque is continuously controlled by electrification control for the electromagnetic clutch, and the distribution ratio of the torque is continuously variably controlled within a predetermined adjustable range which is determined in terms of physical and electrical configurations of the front differential 320.

The front differential 320 is electrically connected to the ECU 100, and the electrification control for the electromagnetic clutch is also controlled by the ECU 100. Therefore, the ECU 100 can generate a desired front-wheel left-right driving force difference (which is a driving force difference herein) Fr, through drive control of the front differential 320. Incidentally, the configuration of the front differential 320 is not limited to what is exemplified herein, but can have various aspects regardless of being publicly known or unknown, as long as the front differential 320 can distribute a driving force (incidentally, the torque and the driving force have a unique or unambiguous relation) to the left and right wheels at a desired distribution ratio. In any case, such a left-right driving force distributing action is publicly known, and details thereof are not mentioned herein to prevent a complicated explanation.

The rear differential 330 is a distribution-ratio-variable LSD which is configured to distribute the engine torque Te distributed to the side of a rear axle (rear wheel axle) through a propeller shaft 11 by the center differential 310, further to the left and right wheels at a desired distribution ratio set within a predetermined adjustable range. The rear differential 330 is provided with: a planetary gear mechanism including a ring gear, a sun gear, and a pinion carrier; and an electromagnetic clutch for providing differential limiting torque. With the ring gear of the planetary gear mechanism, a differential case is coupled. With the sun gear and the carrier, the axle is coupled on either side. Moreover, the differential limiting torque is continuously controlled by electrification control for the electromagnetic clutch, and the distribution ratio of the torque is continuously variably controlled within a predetermined adjustable range which is determined in terms of physical and electrical configurations of the rear differential 330.

The rear differential 330 is electrically connected to the ECU 100, and the electrification control for the electromagnetic clutch is also controlled by the ECU 100. Therefore, the ECU 100 can generate a desired rear-wheel left-right driving force difference (which is a driving force difference) Fr, through drive control of the rear differential 330. Incidentally, the configuration of the rear differential 330 is not limited to what is exemplified herein, but can have various aspects regardless of being publicly known or unknown, as long as the rear differential 330 can distribute a driving force (incidentally, the torque and the driving force have a unique or unambiguous relation) to the left and right wheels at a desired distribution ratio. In any case, such a left-right driving force distributing action is publicly known, and details thereof are not mentioned herein to prevent a complicated explanation.

The VGRS actuator 400 is a steering transmission ratio varying apparatus, provided with a housing, a VGRS motor, a speed reduction mechanism (or a reduction gear mechanism), and a locking mechanism (all of which are not illustrated). The VGRS actuator 400 is one example of the "front-wheel steering angle varying apparatus" of the present invention.

In the VGRS actuator 400, the VGRS motor, the speed reduction mechanism and the locking mechanism are accommodated in the housing. The housing is fixed to an end on a downstream side of an upper steering shaft 13 coupled with a steering wheel 12 which is a steering input device, and the housing is configured to rotate substantially integrally with the upper steering shaft 13.

The VGRS motor is a DC brushless motor having a rotor as a rotator, a stator as a stationary part, and a rotating shaft as a shaft for outputting a driving force. The stator is fixed to the inside of the housing, and the rotor is rotatably held within the housing. The rotating shaft is coaxially rotatably fixed to the rotor and is coupled with the speed reduction mechanism at an end on the downstream side. To the stator, a drive voltage is supplied from a not-illustrated electric drive circuit.

The speed reduction mechanism is a planetary gear mechanism having a plurality of rotational elements which can perform differential rotation. One of the plurality of rotational element is coupled with the rotating shaft of the VGRS motor, and one of the other rotational elements is coupled with the aforementioned housing. Then, the remaining rotational element is coupled with a lower steering shaft 14.

According to the speed reduction mechanism having such a configuration, a rotational speed of the upper steering shaft 13 according to an operation amount or manipulated variable of the steering wheel 12 (i.e. a rotational speed of the housing 201) and a rotational speed of the VGRS motor (i.e. a rotational speed of the rotating shaft) unambiguously determine a rotational speed of the lower steering shaft 14 coupled with the remaining one rotational element. At this time, it is possible to control an increase and a reduction in the rotational speed of the lower steering shaft 14 by controlling an increase and a reduction in the rotational speed of the VGRS motor by means of the differential action between the rotational elements. In other words, the upper steering shaft 13 and the lower steering shaft 14 can relatively rotate by the action of the VGRS motor and the speed reduction mechanism. Incidentally, in terms of the configuration of each rotational element in the speed reduction mechanism, the rotational speed of the VGRS motor is transmitted to the lower steering shaft 14 in a state of being reduced in accordance with a predetermined reduction ratio which is determined in accordance with a gear ratio between the rotational elements.

As described above, in the vehicle 10, since the upper steering shaft 13 and the lower steering shaft 14 can relatively rotate, a steering transmission ratio is continuously variable in a range set in advance, where the steering transmission ratio is a ratio between a steering wheel angle $\delta_{MA}$, which is the amount of rotation of the upper steering shaft 13, and a front-wheel steering angle $\delta_f$ of the front wheels as the steered wheels, which is unambiguously determined according to the amount of rotation of the lower steering shaft 14 (which is also related to a gear ratio of a rack and pinion mechanism described later).

Incidentally, the locking mechanism is a clutch mechanism provided with a clutch element on the VGRS motor side and a clutch element on the housing side. In the condition that both the clutch elements engage with each other, the rotational speed of the upper steering shaft 13 matches the rotational speed of the rotating shaft of the VGRS motor. Thus, inevitably, the rotational speed of the lower steering shaft 14 also matches them. In other words, the upper steering shaft 13 and the lower steering shaft 14 are directly connected. The details of the locking mechanism correlate weakly with the embodiment, and thus, the details are omitted herein.

Incidentally, the VGRS actuator 400 is electrically connected to the ECU 100, and the operation thereof is controlled by the ECU 100.

In the vehicle 10, the rotation of the lower steering shaft 14 is transmitted to a rack and pinion mechanism. The rack and pinion mechanism is a steering transmission mechanism including a not-illustrated pinion gear connected to a downstream end of the lower steering shaft 14 and a rack bar 15 in which gear teeth engaging with the gear teeth of the pinion gear are formed. The rack and pinion mechanism is configured to transmit a steering force to each of the steered wheels via a tie rod and a knuckle (whose reference numerals are omitted) coupled with both ends of the rack bar 15, by converting the rotation of the pinion gear into a horizontal motion of the rack bar 15 in FIG. 1. In other words, the transmission mechanism for transmitting the steering force from the steering wheel 12 to each of the front wheels is one example of the "steering apparatus" of the present invention.

The EPS actuator 500 is a steering torque assisting apparatus as one example of the "steering reaction force controlling device" of the present invention, which is provided with an EPS motor as a DC brushless motor including a not-illustrated rotor as a rotator to which a permanent magnet is attached, and a stator as a stationary part which surrounds the rotor.

The EPS motor is configured to generate EPS torque $T_{eps}$ in a direction of rotation of the rotor, where the rotor is rotated by the action of a rotating magnetic field formed in the EPS motor due to the electrification to the stator via a not-illustrated electrical drive.

On the other hand, a not-illustrated reduction gear is fixed to a motor shaft as a rotating shaft of the EPS motor, and this reduction gear also directly or indirectly engages with a reduction gear mounted on the lower steering shaft 14. Thus, in the embodiment, the EPS torque $T_{eps}$ generated from the EPS motor functions as torque for assisting the rotation of the lower steering shaft 14. Thus, if the EPS torque $T_{eps}$ is applied in the same direction as that of driver steering torque MT applied to the upper steering shaft 13 via the steering wheel 12, a driver's steering load is reduced by the amount of the EPS torque $T_{eps}$.

Incidentally, the EPS actuator 500 is a so-called electronically-controlled power steering apparatus which is configured to assist the driver steering torque by using the torque of the motor which is electrically connected to the ECU 100 and whose operation is controlled by the ECU 100. However, a power steering apparatus provided for the vehicle 10 may be a so-called hydraulic power steering apparatus which is configured to reduce the driver's steering load by using a hydraulic driving force applied via a hydraulic driving apparatus.

Moreover, the VGRS actuator 400 and the EPS actuator 500 may be configured as a mutually integrated actuator.

The vehicle 10 is provided with a steering wheel angle sensor 16 and a steering torque sensor 17.

The steering wheel angle sensor 16 is an angle sensor which is configured to detect the steering wheel angle $\delta_{MA}$, which indicates the amount of rotation of the upper steering shaft 13. The steering wheel angle sensor 16 is electrically connected to the ECU 100, and the detected steering wheel angle $\delta_{MA}$ is referred to by the ECU 100 with a regular or irregular period.

The steering torque sensor 17 is a sensor which is configured to detect the driver steering torque MT applied via the steering wheel 12 from a driver. Explaining it more specifically, the upper steering shaft 13 has such a configuration that it is divided into an upstream part and a downstream part and that the parts are mutually coupled by using a not-illustrated torsion bar. To the both ends of the torsion bar on the upstream side and the downstream side, rings for detecting a rotational phase difference are fixed. The torsion bar is twisted in its rotational direction in accordance with steering torque transmitted via the upstream part of the upper steering shaft 13 when the driver of the vehicle 10 operates the steering wheel 12 (i.e. the driver steering torque MT), and the torsion bar is configured to transmit the steering torque to the downstream part while generating the twist. Therefore, upon the transmission of the steering torque, there is the rotational phase difference between the rings for detecting the rotational phase difference described above. The steering torque sensor 17 is configured to detect the rotational phase difference, to convert the rotational phase difference to the steering torque, and to output it as an electrical signal corresponding to the driver steering torque MT. The steering torque sensor 17 is electrically connected to the ECU 100, and the detected driver steering torque MT is referred to by the ECU 100 with a regular or irregular period.

Incidentally, the method of detecting the steering torque is not limited to this type of torsion bar method, but may adopt another method.

For example, a configuration in which a torque sensor is incorporated in the EPS actuator 500 is also general. In specifying the driver steering torque MT, a method of using a detection value of the torque sensor, estimating the driver steering torque MT on the basis of the detection value of the torque sensor, or the like may be adopted. In this case, the steering torque sensor 17, which is configured as a body different from the EPS actuator 500, is not necessarily installed.

The ECB 600 is an electronically-controlled braking apparatus as another example of the "braking/driving force varying device" of the present invention, which is configured to apply a braking force individually to each of the left and right front and rear wheels of the vehicle 10. The ECB 600 is provided with: a brake actuator 610; and braking apparatuses 620FL, 620FR, 620RL, and 620RR corresponding to the left front wheel FL, the right front wheel FR, the left rear wheel RL and the right rear wheel RR, respectively.

The brake actuator 610 is a hydraulic control actuator which is configured to supply hydraulic oil individually to each of the braking apparatuses 620FL, 620FR, 620RL, and 620RR. The brake actuator 610 is provided with a master cylinder, an electric oil pump, a plurality of hydraulic transmission paths, an electromagnetic valve disposed in each of the hydraulic transmission paths, and the like. The brake actuator 610 is configured to control the opening/closing state of the electromagnetic valve, thereby controlling the hydraulic pressure of the hydraulic oil supplied to a wheel cylinder provided for each braking apparatus, individually in each braking apparatus. The hydraulic pressure of the hydraulic oil has a one-to-one relation with the pressing force of a braking pad provided for each braking apparatus, and the high and low hydraulic pressures of the hydraulic oil correspond to the large and small braking forces of each braking apparatus, respectively.

The brake actuator 610 is electrically connected to the ECU 100, and the braking force applied to each wheel from respective one of the braking apparatuses is controlled by the ECU 100.

The vehicle 10 is provided with an in-vehicle camera 18 and a vehicle speed sensor 19.

The in-vehicle camera 18 is an imaging apparatus which is disposed on a front nose of the vehicle 10 and which is configured to image a predetermined area ahead of the vehicle 10. The in-vehicle camera 18 is electrically connected to the ECU 100, and the imaged area ahead is sent out to the ECU 100 as image data with a regular or irregular period. The ECU 100 can analyze the image data and obtain various data necessary for LKA control described later.

The vehicle speed sensor 19 is a sensor which is configured to detect a vehicle speed V as the speed or velocity of the vehicle 10. The vehicle speed sensor 19 is electrically connected to the ECU 100, and the detected vehicle speed V is referred to by the ECU 100 with a regular or irregular period.

The car navigation apparatus 700 is an apparatus which is configured to provide various navigation information, including information about a position of the vehicle 10, information about a road around the vehicle 10 (a road type, a road width, the number of lanes, a speed limit, a road shape, etc.), traffic light information, information about various facilities located around the vehicle 10, traffic congestion information, environmental information, and the like, on the basis of signals obtained via a GPS antenna and a VICS antenna disposed in the vehicle 10. The car navigation apparatus 700 is electrically connected to the ECU 100, and an operating state thereof is controlled by the ECU 100.

The ARS actuator 800 is a rear wheel steering actuator as one example of the "rear wheel steering angle varying apparatus" of the present invention, which is configured to change a rear wheel steering angle $\delta_r$, which is a steering angle of the left rear wheel RL and the right rear wheel RR, independently of a steering input given by the driver via the steering wheel 12.

The ARS actuator 800 has a built-in ARS motor and a built-in reduction gear mechanism, and a drive circuit of the ARS motor is electrically connected to the ECU 100. Therefore, the ECU 100 can control ARS torque $T_{ars}$, which is output torque of the ARS motor, by the control of the drive circuit.

On the other hand, the reduction gear is configured to transmit the torque of the ARS motor to a rear steering rod 20 with deceleration.

The rear steering rod 20 is coupled with the left rear wheel RL and the right rear wheel RR via joint members 21RL and 21RR, respectively. If the rear steering rod 20 is driven in a horizontal one direction in the drawing due to the ARS torque $T_{ars}$, each of the rear wheels is steered in the one direction.

Incidentally, the ARS actuator 800 may be provided with a direct acting mechanism which is configured to convert a rotary motion into a stroke motion. If this type of direct acting mechanism is provided, the rear steering rod 20 may change the steering angle of the rear wheels in accordance with the stroke motion in the horizontal direction of this direct acting mechanism.

Incidentally, the practical aspect of the rear wheel steering apparatus is not limited to that of the ARS actuator 800 illustrated, as long as it can vary the rear wheel steering angle $\delta_r$ in a predetermined range.

The vehicle 10 is further provided with a yaw rate sensor 22 and a slip angle sensor 23.

The yaw rate sensor 22 is a sensor which is configured to detect a yaw rate γ of the vehicle 10. The yaw rate sensor 22 is electrically connected to the ECU 100, and the detected yaw rate γ is referred to by the ECU 100 with a regular or irregular period.

The slip angle sensor 23 is a sensor which is configured to detect a slip angle β of the vehicle 10. The slip angle sensor 23 is electrically connected to the ECU 100, and the detected slip angle β is referred to by the ECU 100 with a regular or irregular period.

Incidentally, the slip angle β may be estimated on the basis of arithmetic algorithm set in advance from the various state controlled variables (e.g. the steering angle of each wheel or a steering angle equivalent value) and the various vehicle state quantities (e.g. the yaw rate γ, the vehicle speed V, etc.).

Incidentally, the vehicle 10 in the embodiment is provided with the driving force distributing apparatus 300 which is configured to change the left-right braking/driving force differences of the front and rear wheels in addition to the VGRS actuator 400 and the ARS actuator 800 for controlling the steering angles of the front and rear wheels independently of the steering input from the driver side. The vehicle configuration as described above, however, is merely a configuration example which can be adopted by the vehicle of the present invention, which is exemplified for convenience to easily explain variations of a vehicle motion model for realizing control between the yaw rate γ or the slip angle β and steering reaction torque T in fail-safe control described later.

For example, the vehicle of the present invention may have such a vehicle configuration that the driving force distributing apparatus 300 is not provided in regard to the vehicle 10. Further to that, the configuration that this type of driving force distributing apparatus is not provided, is predominantly advantageous in terms of cost, vehicle weight, and installation space. The vehicle of the present invention is equipped only with the front-wheel and rear-wheel steering angle varying apparatuses, as a preferred form. Even in the configuration that the driving force distributing apparatus is not provided, the fail-safe control described later can be performed without any problem in practice.

<1-2: Operation of Embodiment>
<1-2-1: Details of LKA Control>

Figure 2:
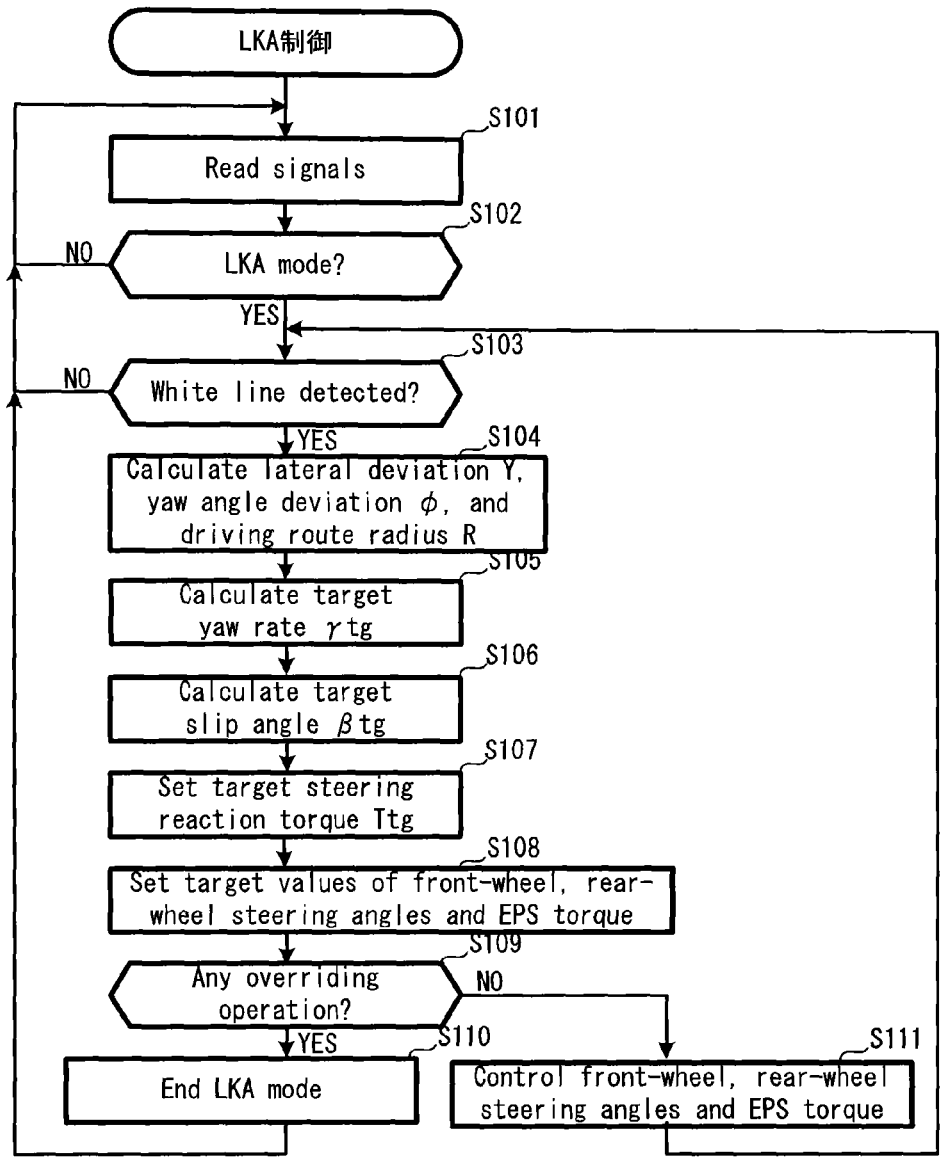
FIG. 2 is a flowchart illustrating LKA control performed in the vehicle illustrated in FIG. 1.

Hereinafter, with reference to FIG. 2, the details of LKA control performed by the ECU 100 will be explained as the operation of the embodiment. FIG. 2 is a flowchart illustrating the LKA control. Incidentally, the LKA control adopts an aspect of coordinated control in which steering reaction torque control for maintaining the steering reaction torque T at target steering reaction torque is coordinated with trajectory following control for making the vehicle 10 follow a target driving route (i.e. a lane in the embodiment). The LKA control is one of driving support controls performed in the vehicle 10.

In FIG. 2, the ECU 100 reads various signals including operating signals of various switches or the like provided for the vehicle 10, various flags, sensor signals associated with the aforementioned various sensors, and the like (step S101). At the same time, the ECU 100 determines whether or not a LKA mode is selected, as a result of such an action that an operation button, disposed in the vehicle interior of the vehicle 10 in advance, for initiating the LKA mode is operated by the driver or similar actions (step S102). If the LKA mode is not selected (the step S102: NO), the ECU 100 returns the processing to the step S101.

If the LKA mode is selected (the step S102: YES), the ECU 100 determines whether or not a white line (not necessarily white) for defining the target driving route of the LKA is detected on the basis of the image data sent out from the in-vehicle camera 18 (step S103).

If the white line is not detected (the step S103: NO), a virtual target driving route cannot be set, and the ECU 100 thus returns the processing to the step S101. On the other hand, if the white line is detected (the step S103: YES), the ECU 100 calculates various road surface information required when the vehicle 10 is made to follow the target driving route (step S104).

In the step S104, a lateral deviation Y, which is a deviation in the lateral direction of the white line and the vehicle 10, a yaw angle deviation $\phi$ between the white line and the vehicle 10, and a driving route radius R are calculated on the basis of a known method.

If the various road surface information is calculated, the ECU 100 calculates a target yaw rate $\gamma_{tg}$ as a target value of the vehicle state quantity required to make the vehicle 10 follow the target driving route (step S105). The step S105 is one example of the operation of the "target yaw rate setting device" of the present invention. The target yaw rate $\gamma_{tg}$ is mapped in a form corresponding to the lateral deviation Y and the yaw angle deviation $\phi$ described above and is stored in a proper memory device, such as a ROM, in advance. The ECU 100 selects a relevant value, as occasion demands, in accordance with the various road surface information calculated in the step S104, thereby setting the target yaw rate $\gamma_{tg}$. Regarding the aspect of setting the target yaw rate $\gamma_{tg}$, various aspects can be applied regardless of being publicly known or unknown.

If the target yaw rate $\gamma_{tg}$ is set, the ECU 100 calculates a target slip angle $\beta_{tg}$ as a target value of the vehicle state quantity required to make the vehicle 10 follow the target driving route (step S106). The step S106 is one example of the operation of the "target slip angle setting device" of the present invention. The target slip angle $\beta_{tg}$ is mapped in a form corresponding to the lateral deviation Y, the yaw angle deviation $\phi$, and the driving route radius R described above and is stored in a proper memory device, such as a ROM, in advance. The ECU 100 selects a relevant value, as occasion demands, in accordance with the various road surface information calculated in the step S104, thereby setting the target slip angle $\beta_{tg}$. Regarding the aspect of setting the target slip angle $\beta_{tg}$, various aspects can be applied regardless of being publicly known or unknown.

If the target slip angle $\beta_{tg}$ is set, the ECU 100 sets target steering reaction torque $T_{tg}$ (step S107). The step S107 is one example of the operation of the "target steering reaction force setting device" of the present invention. The target steering reaction torque $T_{tg}$ is torque acting on the steering apparatus from the front wheels, which are the steered wheels, when the vehicle 10 in making the vehicle 10 follow the target driving route, and it is one example of the "steering reaction force" of the present invention. In the embodiment, the target steering reaction torque $T_{tg}$ is zero. The fact that the target steering reaction torque $T_{tg}$ is zero means that it is not necessary to apply steering retention torque to the steering wheel 12 when the vehicle 10 follows the target driving route and that hands-free driving is possible.

Then, the ECU 100 calculates a target front-wheel steering angle, a target rear-wheel steering angle, and target EPS torque, which are target values of the front-wheel steering angle $\delta_f$, the rear-wheel steering angle $\delta_r$, and the EPS torque $T_{eps}$, respectively, for realizing the target values of the respective vehicle state quantities calculated or set in the steps S105 to S107 (step S108). Incidentally, the detailed methods of determining the target front-wheel steering angle, the target rear-wheel steering angle, and the target EPS torque will be described later. The ECU 100 determines the target values of the front-wheel steering angle of, the rear-wheel steering angle $\delta_r$, and the EPS torque $T_{eps}$ (i.e. the target front-wheel steering angle, the target rear-wheel steering angle, and the target EPS torque, respectively), which are intended to set the yaw rate $\gamma$, the slip angle $\beta$, or the steering reaction torque T to the target yaw rate $\gamma_{tg}$, the target slip angle $\beta_{tg}$, and the target steering reaction torque $T_{tg}$, on the basis of the vehicle motion model set in advance for defining a correlation between the yaw rate $\gamma$, the slip angle $\beta$, or the steering reaction torque T and the front-wheel steering angle, the rear wheel steering angle, or the EPS torque.

If the target front-wheel steering angle, the target rear-wheel steering angle and the target EPS torque are obtained, the ECU 100 determines whether or not there is an overriding operation by the driver (step S109). The overriding operation is a steering operation performed by the driver on his/her own intention, i.e. one of the steering inputs to be prioritized most in terms of vehicle driving control. The ECU 100 refers to the sensor outputs of the steering wheel angle sensor 16 and the steering torque sensor 17 when determining whether or not there is the overriding operation, and determines that the overriding operation takes place if the steering angle $\delta_{MA}$ is greater than or equal to a reference value $\delta_{MAth}$ or if the driver steering torque MT is greater than or equal to a reference value $MT_{th}$.

If it is determined that the overriding operation takes place (the step S109: YES), the ECU 100 ends the LKA mode (step S110). If the LKA mode is ended, the processing is returned to the step S101, and a series of the processing operations is repeated.

On the other hand, if the overriding operation does not take place (the step S109: NO), the ECU 100 controls the VGRS actuator 400, the ARS actuator 800, and the EPS actuator 500 so as to obtain the target front-wheel steering angle, the target rear-wheel steering angle, and the target EPS torque calculated in the step S108 (step S111). If the drive control as described above is performed, the processing is returned to the step S103, and a series of the processing operations in the LKA mode is repeated. The LKA control is performed as described above.

<1-2-2: Generation of Yaw Moment Due to Left-right Braking/Driving Force Difference>

Figure 3:
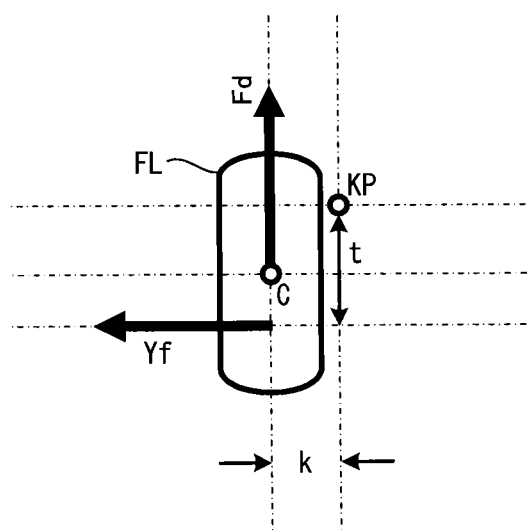
FIG. 3 is a top view illustrating a left front wheel when a driving force acts thereon.

Now, with reference to FIG. 3, a relation between the braking/driving force acting on the wheels and the yaw moment will be explained. FIG. 3 is a top view illustrating the left front wheel FL when a driving force acts thereon. Incidentally, in FIG. 3, portions overlapping those of FIG. 1 will carry the same reference numerals, and the explanation thereof will be omitted as occasion demands.

In FIG. 3, a driving force $F_d$ acts on a contact point C of the left front wheel FL. On the other hand, if a virtual contact point KP of a kingpin axis (which is a virtual steering axis connecting an upper pole joint and a lower pole joint) is shifted from an axis passing through the contact point C as illustrated (which is true in most vehicles), the yaw moment is generated on the left front wheel FL in accordance with a kingpin offset k, which is a distance between the axis and the virtual contact point KP. Here, as is clear from a positional relation illustrated, a direction of generation of the yaw moment in this case is a right-turn direction.

If there is no driving force difference between the left and right wheels, the yaw moment in a left-turn direction having the same magnitude of the yaw moment generated on the left front wheel FL is generated on the right front wheel FR. Therefore, if there is no driving force difference, a vehicle motion is a straight travel.

However, if there is the driving force difference between the left and right wheels, the yaw moment generated on the wheel on the side having a larger driving force is greater than the yaw moment on the other side, and thus, the yaw moment for turning to the wheel side having a smaller driving force is generated in the vehicle 10. Therefore, if the driving force of the left front wheel is increased in comparison with that of the right front wheel, the yaw moment in the right-turn direction is generated, and if the driving force of the right front wheel is increased in comparison with that of the left front wheel, the yaw moment in the left-turn direction is generated.

The yaw moment as described above can be generated in the same manner if the braking force acts instead of the driving force. The braking force is a negative driving force. If there is the braking force difference between the left and right wheels, the yaw moment is generated on the wheel side having a larger braking force. In any case, it is possible to provide the vehicle 10 with turning behavior by applying the left-right braking/driving force difference to at least one of the front wheels and the rear wheels.

Incidentally, if the tire slip angle is generated on the left front wheel FL due to the steering, the turn, or both of them (i.e. if there is a deviation or shift between the direction of a center line of the tire and a direction of travel of the tire), a tire lateral force $Y_f$ is generated in a left direction at a force application point on the rear side of the tire contact point on the left front wheel FL. A distance t between the force application point and the virtual contact point KP means the sum of a caster trail, which is an axial-direction distance between the virtual contact point KP and the tire contact point C, and a pneumatic trail, which is a distance between the tire contact point C and the tire lateral force $Y_f$.

Incidentally, the yaw moment is also generated due to the lateral force. Moreover, the lateral force is generated in the same manner on the right front wheel FR, and is generated in the same manner on each of the rear wheels (RL and RR) as a lateral force $Y_r$.

<1-2-3: Methods of Determining Target Front-wheel Steering Angle, Target Rear-wheel Steering Angle, and Target EPS Torque Based on Vehicle Motion Model>

Next, an explanation will be given to the operation in the step S108 in the LKA control, i.e. the determination of the target front-wheel steering angle, the target rear-wheel steering angle, and the target EPS torque based on the vehicle motion model. Incidentally, a meaning indicated by each reference numeral in the following each equation described later is noted in advance.

s . . . Laplace operator
$\delta_f$ . . . Front-wheel steering angle
$\delta_r$ . . . Rear-wheel steering angle
$\beta$ . . . Slip angle
$\gamma$ . . . Yaw rate
T . . . Steering reaction torque (torque around the kingpin shaft in the embodiment)
V . . . Vehicle speed
$M_f$ . . . Front shaft mass
$M_r$ . . . Rear shaft mass
M . . . Vehicle mass ($M=M_f+M_r$)
I . . . Yawing inertia moment
L . . . Wheelbase
$L_f$ . . . Longitudinal distance from vehicle center of gravity to front shaft
$L_r$ . . . Longitudinal distance from vehicle center of gravity to rear shaft
$K_f$ . . . Front-wheel cornering power
$K_r$ . . . Rear-wheel cornering power
$T_f$ . . . Front shaft tread
$T_r$ . . . Rear shaft tread
t . . . Longitudinal trail amount
k . . . Kingpin offset
$Y_f$ . . . Front-wheel lateral force
$Y_r$ . . . Rear-wheel lateral force
$F_{fl}$ . . . Left-front-wheel driving force
$F_{fr}$ . . . Right-front-wheel driving force
$F_{rl}$ . . . Left-rear-wheel driving force
$F_{rr}$ . . . Right-rear-wheel driving force
$F_f$ . . . Front-wheel left-right braking/driving force difference
$F_r$ . . . Rear-wheel left-right braking/driving force difference The front-wheel steering angle $\delta_f$, the rear-wheel steering angle $\delta_r$, and the EPS torque $T_{eps}$ are expressed eventually by the following equation (7) from the following equation (6) which is obtained by solving vehicle motion equations expressed by the following equations (1) to (5) in terms of the slip angle $\beta$, the yaw rate $\gamma$ and the steering reaction torque T.

[Equation 1]
$$M*V*\left(\frac{d\beta}{dt}+\gamma\right)=2*(Y_f+Y_r) \quad (1)$$

[Equation 2]
$$I*\frac{d\gamma}{dt}=2*(L_f*Y_f-L_r*Y_r) \quad (2)$$

[Equation 3]
$$T=2*t*Y_f+T_{eps} \quad (3)$$

[Equation 4]
$$Y_f=-K_f*\left\{\beta+\left(\frac{L_f*\gamma}{V}\right)-\delta_f\right\} \quad (4)$$

[Equation 5]
$$Y_r=-K_r*\left\{\beta-\left(\frac{L_r*\gamma}{V}\right)-\delta_r\right\} \quad (5)$$

[Equation 6]
$$A*\begin{bmatrix}\beta\\\gamma\\T\end{bmatrix}=B*\begin{bmatrix}\delta_f\\\delta_r\\T_{eps}\end{bmatrix} \quad (6)$$

[Equation 7]
$$\begin{bmatrix}\delta_f\\\delta_r\\T_{eps}\end{bmatrix}=B^{-1}*A*\begin{bmatrix}\beta\\\gamma\\T\end{bmatrix} \quad (7)$$

Here, the matrix A is expressed by the following equation (8).

[Equation 8]
$$A=\begin{bmatrix}A11 & A12 & A13\\A21 & A22 & A23\\A31 & A32 & A33\end{bmatrix} \quad (8)$$

Moreover, $B^{-1}$ is an inverse matrix of the matrix B, and the matrix B is expressed by the following equation (9).

[Equation 9]

$$B = \begin{bmatrix} B11 & B12 & B13 \\ B21 & B22 & B23 \\ B31 & B32 & B33 \end{bmatrix} \quad (9)$$

On the other hand, the matrix coefficients A11, A12, A13, A21, A22, A23, A31, A32 and A33 of the matrix A are expressed by the following equations (10) to (18), respectively.

[Equation 10]

$$A11 = 2*(K_f + K_r) + M*V*s \quad (10)$$

[Equation 11]

$$A12 = M*V + \frac{2}{V}*(L_f*K_f - L_r*K_r) \quad (11)$$

[Equation 12]

$$A13 = 0 \quad (12)$$

[Equation 13]

$$A21 = 2*(L_f*K_f - L_r*K_r) \quad (13)$$

[Equation 14]

$$A22 = \frac{2}{V}*(L_f^2*K_f + L_r^2*K_r) + I*s \quad (14)$$

[Equation 15]

$$A23 = 0 \quad (15)$$

[Equation 16]

$$A31 = 2*t*K_f \quad (16)$$

[Equation 17]

$$A32 = \frac{2*t*L_f*K_f}{V} \quad (17)$$

[Equation 18]

$$A33 = 1 \quad (18)$$

On the other hand, the matrix coefficients B11, B12, B13, B21, B22, B23, B31, B32 and B33 of the matrix B are expressed by the following equations (19) to (27), respectively.

[Equation 19]

$$B11 = 2*K_f \quad (19)$$

[Equation 20]

$$B12 = 2*K_r \quad (20)$$

[Equation 21]

$$B13 = 0 \quad (21)$$

[Equation 22]

$$B21 = 2*L_f*K_f \quad (22)$$

[Equation 23]

$$B22 = -2*L_r*K_r \quad (23)$$

[Equation 24]

$$B23 = 0 \quad (24)$$

[Equation 25]

$$B31 = 2*t*K_f \quad (25)$$

[Equation 26]

$$B32 = 0 \quad (26)$$

[Equation 27]

$$B33 = 1 \quad (27)$$

In this manner, the target values of the state controlled variables ($\delta_f$, $\delta_r$ and $T_{eps}$) for realizing the target vehicle state quantities are determined. by substituting the target values calculated in the steps S106, S105, and S107 in the LKA control, for β, γ and T in the aforementioned equation (7).

<1-2-4: Details of Fail-safe Control>

Figure 4:
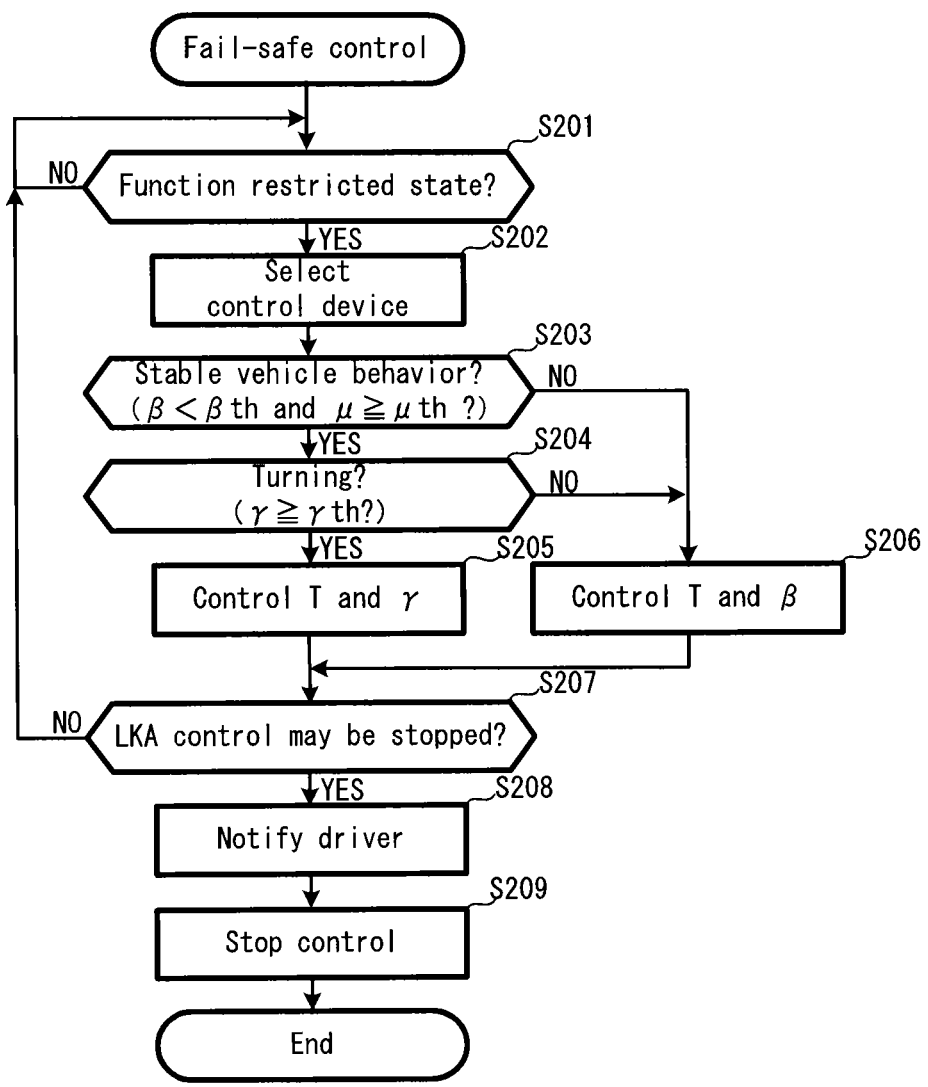
FIG. 4 is a flowchart illustrating fail-safe control performed in the vehicle illustrated in FIG. 1.

Next, with reference to FIG. 4, the details of the fail-safe control will be explained. FIG. 4 is a flowchart illustrating the fail-safe control.

Incidentally, the fail-safe control is performed by the ECU 100 all the time in a LKA control execution period, and the control content of the fail-safe control is prioritized over the LKA control.

In FIG. 4, the ECU 100 determines functional states of the VGRS actuator 400 and the ARS actuator 800, and determines whether or not the actuators are in a function restricted state (step S201).

Here, the "function restricted state" means a state in which at least one of the actuators is broken, or a state in which the function is remarkably restricted due to some circumstances. More specifically, the "function restricted state" means a state in which the motor of each actuator does not operate normally, a state in which there is an operation restriction due to a heat load, a state in which the operating speed of each actuator is not sufficiently ensured due to a load in terms of the control of the ECU 100, or the like. Incidentally, a detailed aspect associated with the determination of whether or not each actuator is in the function restricted state will be omitted because various known failure detection controls can be applied. As a result of the determination, if both the actuators are in a normal state which is not the function restricted state (the step S201: NO), the processing is in a standby state in the step S201.

On the other hand, if at least one of the actuators is in the function restricted state (the step S201: YES), the ECU 100 selects a control device (step S202). If at least one of the actuators is in the function restricted state, the state controlled variable holding the controllability in the LKA control is only the EPS torque $T_{eps}$, or only one of the front-wheel steering angle $\delta_f$ and the rear-wheel steering angle $\delta_r$, and thus, the slip angle β and the yaw rate γ cannot be independently controlled in the LKA control. Therefore, it is necessary to select the remaining device which is not in the function restricted state to control one of the slip angle β and the yaw rate γ.

Thus, in the step S202, as the control device, the ECU 100 selects the ARS actuator 800 if the VGRS actuator 400 is in the function restricted state, selects the VGRS actuator 400 if the ARS actuator 800 is in the function restricted state, and selects the driving force distributing apparatus 300 if both the actuators are in the function restricted state.

After selecting the control device, the ECU 100 determines whether or not the vehicle behavior is stable on the basis of the slip angle β and a road surface friction coefficient μ (i.e. one example of the "stability state quantity" of the present invention) (step S203). More specifically, the ECU 100 determines whether or not the slip angle β is less than a reference value $β_{th}$ and whether or not the road surface friction coefficient μ is greater than or equal to a reference value $μ_{th}$.

If the vehicle behavior is not stable (the step S203: NO), the ECU 100 selects the slip angle β unconditionally as a control target, and controls the steering reaction torque T and the slip angle β on the basis of the EPS torque $T_{eps}$ and the state controlled variable corresponding to the previously selected control device (the front-wheel steering angle of, the rear-wheel steering angle $δ_r$, the front-wheel left-right braking/driving force difference $F_f$, or the rear-wheel left-right braking/driving force difference $F_r$) (step S206). On the other hand, if the vehicle behavior is stable (the step S203: YES), the ECU 100 further determines whether or not the vehicle 10 is turning (step S204). More specifically, the ECU 100 determines whether or not the yaw rate γ is greater than or equal to a reference value $γ_{th}$. If the vehicle 10 is not turning (the step S204: NO), the ECU 100 determines that it is less necessary to aggressively control the yaw rate γ, and moves the processing to the step S206.

In the step S204, if it is determined that the vehicle 10 is turning (the step S204: YES), the ECU 100 selects the yaw rate γ as the control target, and controls the steering reaction torque T and the yaw rate γ on the basis of the EPS torque $T_{eps}$ and the state controlled variable corresponding to the previously selected control device (the front-wheel steering angle $δ_f$, the rear-wheel steering angle $δ_r$, the front-wheel left-right braking/driving force difference $F_f$, or the rear-wheel left-right braking/driving force difference $F_r$) (step S205). Incidentally, practical control aspects in the step S205 and the step S206 will be described later.

After the step S205 or the step S206 is performed, the processing is moved to a step S207, and it is determined whether or not the LKA control is to be ended, i.e. it is determined whether or not the state of the vehicle 10 corresponds to an allowable condition of the present invention. Incidentally, in the embodiment, the allowable condition is that the vehicle 10 is in a stop state. If the vehicle 10 has not stopped (the step S207: NO), the ECU 100 returns the processing to the step S201, and repeats the processing.

Incidentally, at this time, if at least one of the VGRS actuator 400 and the ARS actuator 800 has returned from the function restricted state, proper control is controlled at each time. In other words, if both the actuators are in the normal state due to the return from the function restricted state, return processing is performed from the alternative trajectory following control using the yaw rate γ or the slip angle β to the normal LKA control. Moreover, if one of the actuators has returned into the normal state due to the return from the function restricted state, the state controlled variable in the alternative trajectory following control is changed from the front-wheel or rear-wheel left-right braking/driving force difference to the state control variable corresponding to the one actuator which has returned into the normal state. In other words, the control device is reselected in the step S202.

On the other hand, in the step S207, if it is determined that the LKA control may be stopped (the step S207: 'YES), the ECU 100 notifies the driver that at least one of the VGRS actuator 400 and the ARS actuator 800 is in the function restricted state, by means of information display via a display apparatus disposed in the car navigation apparatus 700, lighting control of various information lamps disposed in a meter hood, or the like (step S208). If the driver is notified, the LKA control (which is, in this case, alternative LKA control in which the controllability is applied to only one of the slip angle β and the yaw rate γ) is ended (step S209).

Incidentally, if the LKA control is ended due to the state transition to the function restricted state of the actuator, the execution of the LKA control is forbidden, for example, unless the flag in the ECU 100 is reset after proper maintenance.

As explained above, according to the fail-safe control in the embodiment, if the trajectory following control coordinated with the control of the steering reaction torque T in the LKA control cannot be normally continued because at least one of the VGRS actuator 400 and the ARS actuator 800 is in the function restricted state, the trajectory following control, which is originally two-degree-of-freedom motion control realized by independently controlling the slip angel β and the yaw rate γ, is continued after being changed to one-degree-of-freedom trajectory following control in which one of the slip angel β and the yaw rate γ is controlled.

Here, one of the slip angel β and the yaw rate γ matching the vehicle behavior at that time point is selected as the vehicle state quantity to be prioritized, on the basis of the degree of stability of the vehicle behavior at that time point and the turning behavior of the vehicle. In other words, the slip angle β is aggressively selected if the vehicle behavior is unstable (here, large slip angle, or large road surface friction coefficient), the yaw rate γ is aggressively selected if the vehicle is turning in the state in which the vehicle behavior is stable, and the slip angle β which can lead the vehicle behavior to the more stable side is selected in an elimination method if there are no circumstances to be prioritized.

Therefore, in comparison with not only a case where the LKA control is ended uniformly and forcibly due to the fact that at least one of the actuators is in the function restricted state, but also a case where the control of one of the vehicle state quantities is simply continued without being based on any guideline, it is possible to maintain the optical vehicle behavior as long as possible in a limp period until the LKA control is eventually ended.

<2: Second Embodiment>

Figure 5:
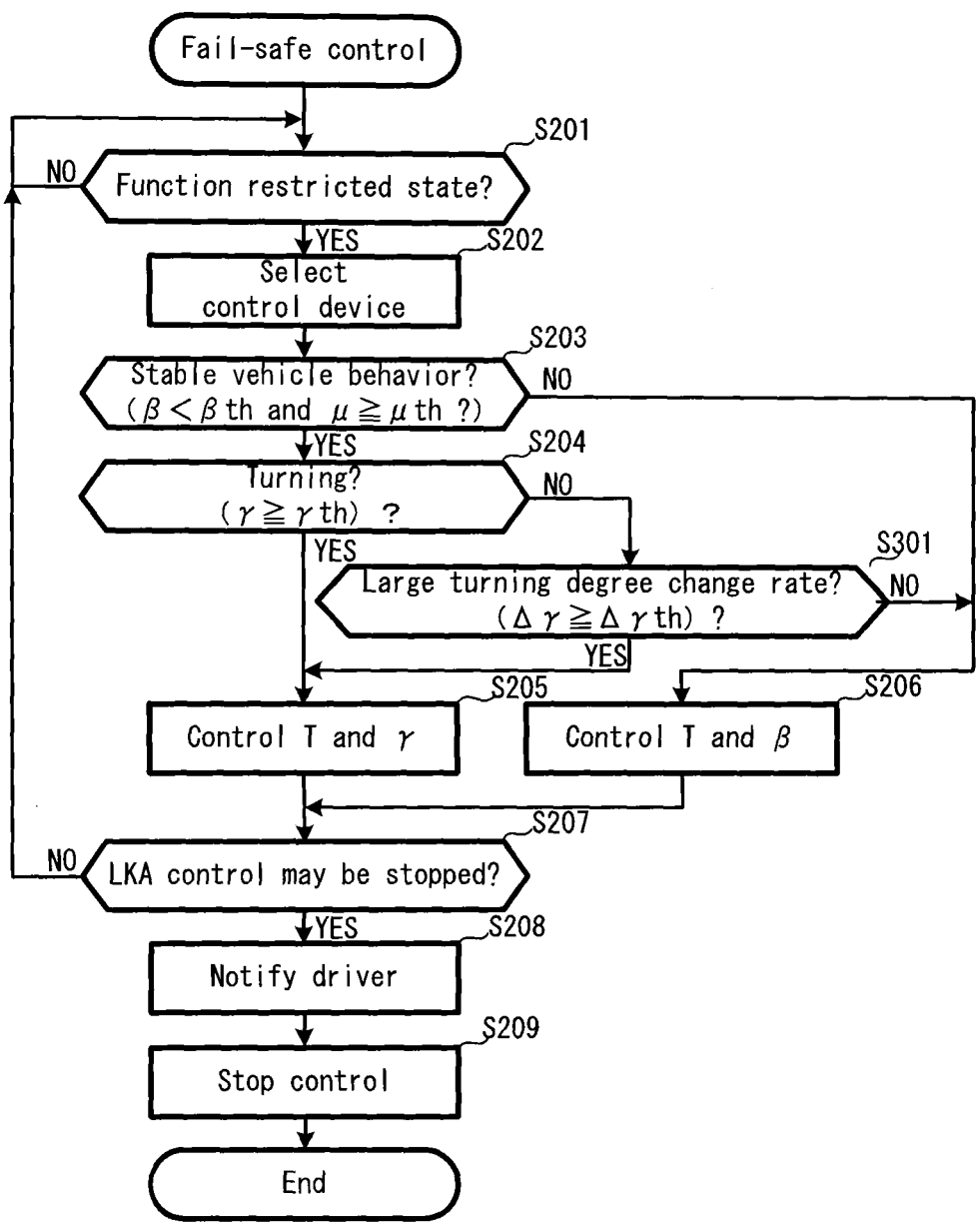
FIG. 5 is a flowchart illustrating fail-safe control in a second embodiment of the present invention.

Next, with reference to FIG. 5, fail-safe control in a second embodiment of the present invention will be explained. FIG. 5 is a flowchart illustrating the fail-safe control in the second embodiment. Incidentally, in FIG. 3, portions overlapping those of FIG. 4 will carry the same reference numerals, and the explanation thereof will be omitted as occasion demands.

In FIG. 5, if the vehicle behavior is stable and if the vehicle 10 is not turning (the step S204: NO), the ECU 100 further determines whether or not a turning degree change rate is large (step S301). More specifically, the ECU 100 determines whether or not a change rate Δγ of the yaw rate γ is greater than or equal to a reference value $Δγ_{th}$. If the turning degree change rate is small (the step S301: NO), the ECU 100 moves the processing to the step S206 and selects the slip angle β as the vehicle state quantity. If the turning degree change rate is large (the step S301: YES), the ECU 100 moves the processing to the step S205 and selects the yaw rate γ as the vehicle state quantity.

Here, the turning degree change rate is large, specially at the beginning of the turning, such as, for example, in urgent avoidance driving which causes sudden turning operation (e.g. driving for avoiding an obstacle ahead). Although such a situation is not prioritized over a result of the determination in the step S203, it could be a rational reason to aggressively control the yaw rate γ. In other words, according to the embodiment, the yaw rate γ can be selected for the more rational reason, in one portion of the condition that the slip angle β is selected for the negative reason in the first embodiment. Therefore, it is possible to stabilize the vehicle behavior, more realistically.

<3: Third Embodiment>

Figure 6:
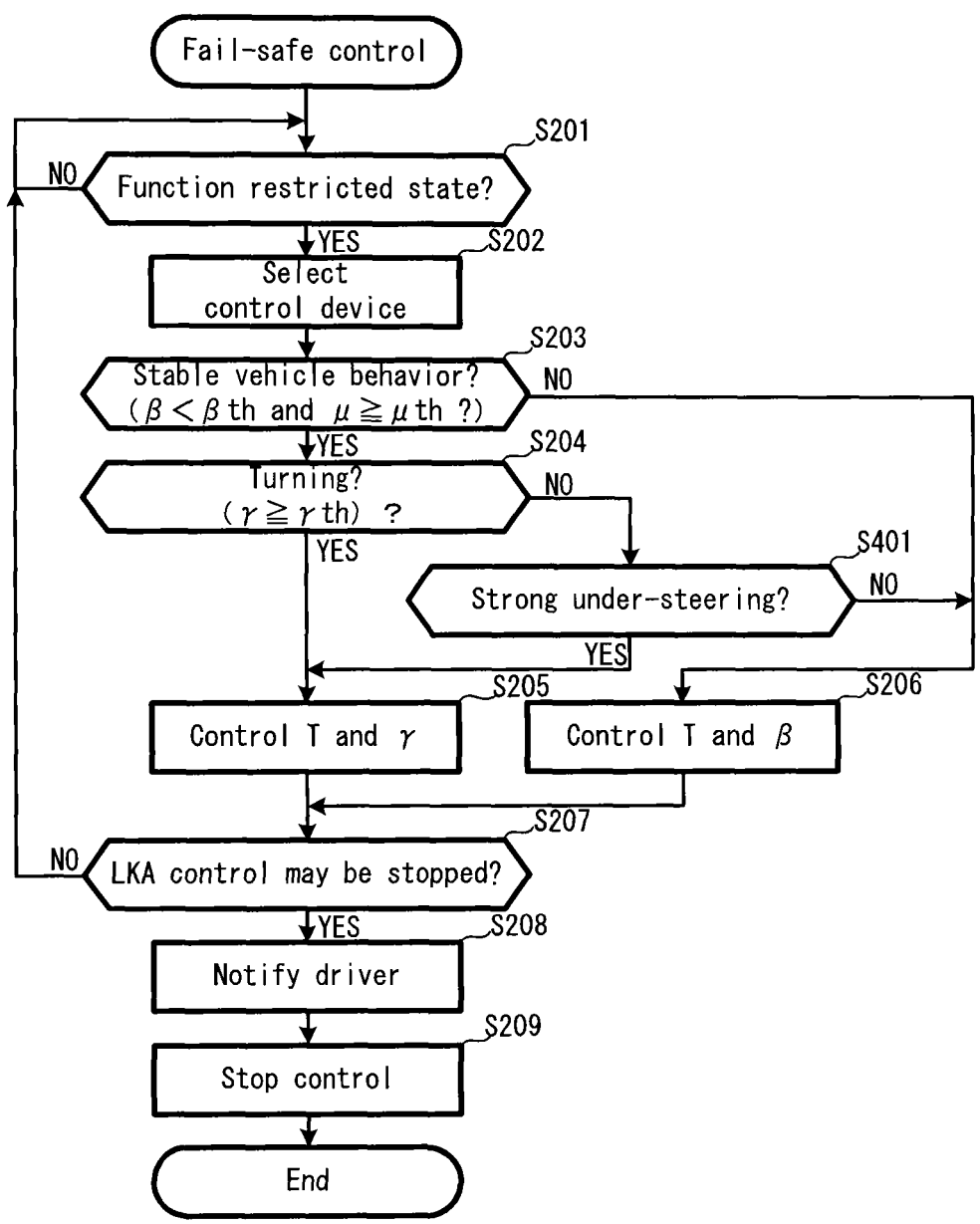
FIG. 6 is a flowchart illustrating fail-safe control in a third embodiment of the present invention.

Next, with reference to FIG. 6, fail-safe control in a third embodiment of the present invention will be explained. FIG. 6 is a flowchart illustrating the fail-safe control in the third embodiment. Incidentally, in FIG. 6, portions overlapping those of FIG. 4 will carry the same reference numerals, and the explanation thereof will be omitted as occasion demands.

In FIG. 6, if the vehicle behavior is stable and if the vehicle 10 is not turning (the step S204: NO), the ECU 100 further determines whether or not a steering state of the vehicle 10 is strong under-steering (step S401). More specifically, the ECU 100 determines whether or not the degree of an outward deviation in the turning of the vehicle 10 with respect to the target driving route in the trajectory following control is greater than or equal to a reference value. The determination as described above can be performed on the basis of the yaw angle deviation $\phi$ and the driving route radius R or the like calculated in the step S104 in the LKA control.

If the steering characteristic of the vehicle 10 is an over-steering characteristic, a neutral-steering characteristic, or a weak under-steering characteristic (the step S401: NO), the EUC 100 moves the processing to the step S206 and selects the slip angle $\beta$ as the vehicle state quantity. If the steering characteristic is the strong under-steering characteristic (the step S401: YES), the ECU 100 moves the processing to the step S205 and selects the yaw rate $\gamma$ as the vehicle state quantity.

Here, if the steering characteristic of the vehicle 10 is the strong under-steering characteristic, a centripetal force in a turning central direction is reduced. Thus, from the viewpoint of stabilizing the vehicle behavior, the yaw rate $\gamma$ is to be prioritized over the slip angle $\beta$. In other words, according to the embodiment, the yaw rate $\gamma$ can be selected for the more rational reason, in one portion of the condition that the slip angle $\beta$ is selected for the negative reason in the first embodiment. Therefore, it is possible to stabilize the vehicle behavior, more realistically.

<4: Fourth Embodiment>

Figure 7:
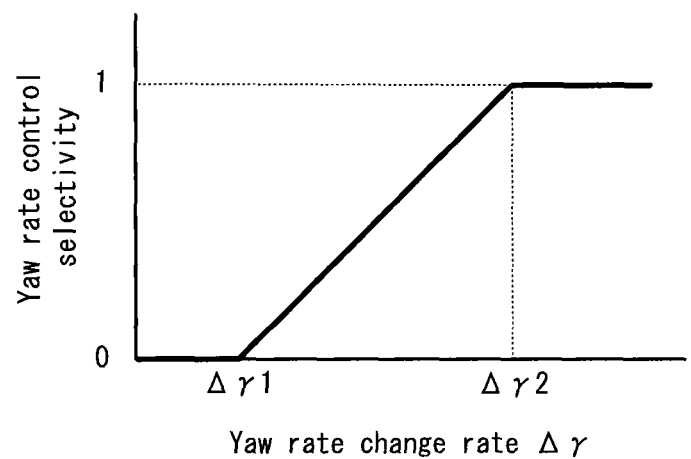
FIG. 7 is a diagram exemplifying a relation between a yaw rate change rate and yaw rate control selectivity in a fourth embodiment of the present invention.

In each of the embodiments described above, one of the slip angle $\beta$ and the yaw rate $\gamma$ is selected, as the vehicle state quantity in the trajectory following control which is continued with one degree of freedom. However, the practical aspect of the selecting device of the present invention is not limited to such binary selection. Now, a fourth embodiment of the present invention based on the concept described above will be explained with reference to FIG. 7. FIG. 7 is a diagram exemplifying a relation between a yaw rate change rate $\Delta\gamma$ and yaw rate control selectivity.

In FIG. 7, the yaw rate control selectivity means a selection ratio of the yaw rate $\gamma$ and the slip angle $\beta$, and indicates that 100% yaw rate $\gamma$ is selected in the case of "1", and that 100% slip angle $\beta$ is selected in the case of "0". In FIG. 7, the yaw rate control selectivity is "0" in a region of $\Delta\gamma<\Delta\gamma 1$, and the yaw rate control selectivity is "1" in a region of $\Delta\gamma\geq\Delta\gamma 2$. In a middle region, the yaw rate control selectivity increases linearly in accordance with $\Delta\gamma$.

Incidentally, since at least one of the actuators is in the function restricted state, the degree of freedom of the vehicle motion is simply one degree of freedom, except for the steering reaction torque. Therefore, the yaw rate control selectivity is used as a value for defining selection frequency if there is a plurality of selection opportunities.

For example, in the fail-safe control in the second embodiment (refer to FIG. 5), the step S301 can be replaced by a step of determining a control ratio in accordance with the relation illustrated in FIG. 7. In this case, for example, if the yaw rate control selectivity is 0.5, the slip angle $\beta$ is selected once out of twice. As described above, even under the situation that the degree of freedom of the vehicle motion is limited to one degree of freedom, it is possible to control both the slip angle $\beta$ and the yaw rate $\gamma$ at an appropriate ratio, and it is thus possible to perform finer vehicle behavior control.

<5: Fifth Embodiment>

Figure 8:
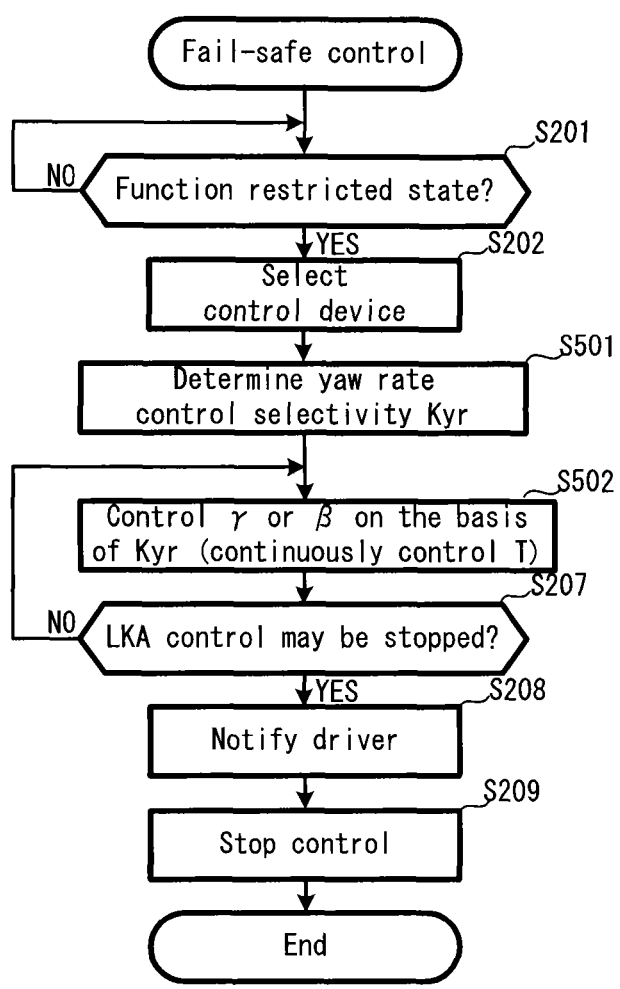
FIG. 8 is a flowchart illustrating fail-safe control in a fifth embodiment of the present invention.

Next, with reference to FIG. 8, fail-safe control in a fifth embodiment of the present invention will be explained. FIG. 8 is a flowchart illustrating the fail-safe control in the fifth embodiment. Incidentally, in FIG. 8, portions overlapping those of FIG. 4 will carry the same reference numerals, and the explanation thereof will be omitted as occasion demands.

In FIG. 8, after selecting the control device (the step S202), the ECU 100 determines yaw rate control selectivity Kyr (step S501). Here, the yaw rate control selectivity Kyr is equivalent to the yaw rate control selectivity described in the fourth embodiment; however, a determination aspect thereof is different in the fifth embodiment. In other words, the ECU 100 determines the yaw rate control selectivity Kyr with reference to a yaw rate control selectivity map stored in the ROM in advance, by using the yaw rate $\gamma$ and the slip angle $\beta$.

Figure 9:
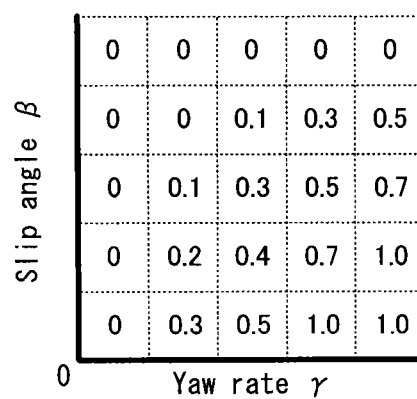
FIG. 9 is a schematic diagram illustrating a yaw rate control selectivity map in the fail safe control illustrated in FIG. 8.

Now, with reference to FIG. 9, the yaw rate control selectivity map will be explained. FIG. 9 is a schematic diagram illustrating the yaw rate control selectivity map.

In FIG. 9, the yaw rate control selectivity Kyr is defined on a two-dimensional map using the slip angle $\beta$ on a vertical axis and the yaw rate $\gamma$ on a horizontal axis. The ECU 100 can determine the yaw rate control selectivity Kyr by selecting one yaw rate control selectivity Kyr according to the yaw rate $\gamma$ and the slip angle $\beta$ at that time point. Incidentally, obviously, the relation exemplified in FIG. 9 is quantified and stored in the ROM.

Back in FIG. 8, after determining the yaw rate control selectivity Kyr, the ECU 100 appropriately selects and controls the yaw rate $\gamma$ and the slip angle $\beta$ on the basis of the determined yaw rate control selectivity Kyr (step S502). If the step S502 is performed, the processing is moved to the step S207.

As described above, according to the fifth embodiment, the yaw rate control selectivity Kyr can be determined on the basis of more parameters, which allows the finer vehicle behavior control.

<6: Control of Vehicle State Quantity in One-degree-of-freedom Trajectory Following Control>

Now, as a technical matter which is common to each embodiment, an explanation will be given to the aspect of controlling the steering reaction torque T and the slip angle $\beta$ or the yaw rate $\gamma$ (e.g. the steps S205 and S206 in FIG. 4) according to the control device (state controlled variable) selected in the step S202. Incidentally, the control aspect uses a vehicle motion model based on vehicle motion equations, as in the step S108 in the LKA control. Hereinafter, an explanation will be given to a relation between the state controlled variable and the vehicle state quantity for each combination of the control device and the vehicle state quantities. There can be eight types of combinations which are (A) to (G) described below.

(A) Control of Steering Reaction Torque T and Yaw Rate $\gamma$ using EPS Torque $T_{eps}$ and Front-wheel Steering Angle $\delta_f$ In this case, a relation between ($T_{eps}$ and $\delta_f$) and (T and $\gamma$) is expressed as the following equation (29) via the following equation (28).

[Equation 28]

$$\begin{bmatrix} \gamma \\ T \end{bmatrix} = C * \begin{bmatrix} \delta_f \\ T_{eps} \end{bmatrix} \quad (28)$$

[Equation 29]

$$\begin{bmatrix} \delta_f \\ T_{eps} \end{bmatrix} = C^{-1} * \begin{bmatrix} \gamma \\ T \end{bmatrix} \quad (29)$$

Here, the matrix C is expressed as the following equation (30). Incidentally, det(A) indicates the matrix A.

[Equation 30]

$$C = \frac{1}{\det(A)} * \begin{bmatrix} C11 & C12 \\ C21 & C22 \end{bmatrix} \quad (30)$$

Moreover, the matrix coefficients C11, C12, C21 and C22 of the matrix C are expressed by the following equations (31) to (34), respectively.

[Equation 31]

$$C11 = \frac{4 * L^2 * K_f * K_r}{V} * \frac{V}{L} + 2 * M * V * L_f * K_f * s \quad (31)$$

[Equation 32]

$$C12 = 0 \quad (32)$$

[Equation 33]

$$C21 = 4 * M * V * t * L_r * K_f * K_r + \\ 4 * t * K_f * K_r * (M * Lr^2 + I) * s + 2 * M * I * V * t * K_f * s^2 \quad (33)$$

[Equation 34]

$$C22 = \frac{4 * L^2 * K_f * K_r}{V} - 2 * M * V * (L_f * K_f - L_r * K_r) + \\ 2 * \{I * (K_f + K_r) + M * (L_f^2 * K_f + L_r^2 * K_r)\} * s + M * I * V * s^2 \quad (34)$$

(B) Control of Steering Reaction Torque T and Slip Angle β using EPS Torque $T_{eps}$ and Front-wheel Steering Angle $\delta_f$ In this case, a relation between ($T_{eps}$ and $\delta_f$) and (T and β) is expressed as the following equation (36) via the following equation (35).

[Equation 35]

$$\begin{bmatrix} \beta \\ T \end{bmatrix} = D * \begin{bmatrix} \delta_f \\ T_{eps} \end{bmatrix} \quad (35)$$

[Equation 36]

$$\begin{bmatrix} \delta_f \\ T_{eps} \end{bmatrix} = D^{-1} * \begin{bmatrix} \beta \\ T \end{bmatrix} \quad (36)$$

Here, the matrix D is expressed as the following equation (37).

[Equation 37]

$$D = \frac{1}{\det(A)} * \begin{bmatrix} D11 & D12 \\ D21 & D22 \end{bmatrix} \quad (37)$$

Moreover, the matrix coefficients D11, D12, D21 and D22 of the matrix D are expressed by the following equations (38) to (41), respectively.

[Equation 38]

$$D11 = \frac{4 * L^2 * K_f * K_r}{V} * \frac{L_r}{L} * \left(1 - \frac{M_r * V^2}{2 * L_r * K_r}\right) + 2 * K_f * I * s \quad (38)$$

[Equation 39]

$$D12 = 0 \quad (39)$$

[Equation 40]

$$D21 = 4 * M * V * t * L_r * K_f * K_r + \\ 4 * t * K_f * K_r * (M * Lr^2 + I) * s + 2 * M * I * V * t * K_f * s^2 \quad (40)$$

[Equation 41]

$$D22 = \frac{4 * L^2 * K_f * K_r}{V} - 2 * M * V * (L_f * K_f - L_r * K_r) + \\ 2 * \{I * (K_f + K_r) + M * (L_f^2 * K_f + L_r^2 * K_r)\} * s + M * I * V * s^2 \quad (41)$$

(C) Control of Steering Reaction Torque T and Yaw Rate γ using EPS Torque $T_{eps}$ and Rear-wheel Steering Angle $\delta_r$ In this case, a relation between ($T_{eps}$ and $\delta_r$) and (T and γ) is expressed as the following equation (43) via the following equation (42).

[Equation 42]

$$\begin{bmatrix} \gamma \\ T \end{bmatrix} = E * \begin{bmatrix} \delta_r \\ T_{eps} \end{bmatrix} \quad (42)$$

[Equation 43]

$$\begin{bmatrix} \delta_r \\ T_{eps} \end{bmatrix} = E^{-1} * \begin{bmatrix} \gamma \\ T \end{bmatrix} \quad (43)$$

Here, the matrix E is expressed as the following equation (44).

[Equation 44]

$$E = \frac{1}{\det(A)} * \begin{bmatrix} E11 & E12 \\ E21 & E22 \end{bmatrix} \quad (44)$$

Moreover, the matrix coefficients E11, E12, E21 and E22 of the matrix E are expressed by the following equations (45) to (48), respectively.

[Equation 45]

$$E11 = \frac{4*L^2*K_f*K_r}{V}*\left(\frac{-V}{L}\right) - 2*M*V*L_r*K_r*s \quad (45)$$

[Equation 46]

$$E12 = 0 \quad (46)$$

[Equation 47]

$$E21 = \quad (47)$$
$$-4*M*V*t*L_r*K_f*K_r + 4*t*K_f*K_r*(M*L_f*L_r - I)*s$$

[Equation 48]

$$E22 = \frac{4*L^2*K_f*K_r}{V} - 2*M*V*(L_f*K_f - L_r*K_r) + \quad (48)$$
$$2*\{I*(K_f+K_r) + M*(L_f^2*K_f + L_r^2*K_r)\}*s + M*I*V*s^2$$

(D) Control of Steering Reaction Torque T and Slip Angle β Using EPS Torque $T_{eps}$ and Rear-wheel Steering Angle $\delta_r$ In this case, a relation between ($T_{eps}$ and $\delta_r$) and (T and β) is expressed as the following equation (50) via the following equation (49).

[Equation 49]

$$\begin{bmatrix} \beta \\ T \end{bmatrix} = F * \begin{bmatrix} \delta_r \\ T_{eps} \end{bmatrix} \quad (49)$$

[Equation 50]

$$\begin{bmatrix} \delta_r \\ T_{eps} \end{bmatrix} = F^{-1} * \begin{bmatrix} \beta \\ T \end{bmatrix} \quad (50)$$

Here, the matrix F is expressed as the following equation (51).

[Equation 51]

$$F = \frac{1}{\det(A)} * \begin{bmatrix} F11 & F12 \\ F21 & F22 \end{bmatrix} \quad (51)$$

Moreover, the matrix coefficients F11, F12, F21 and F22 of the matrix F are expressed by the following equations (52) to (55), respectively.

[Equation 52]

$$F11 = \frac{4*L^2*K_f*K_r}{V}*\left(\frac{L_f}{L}\right)*\left\{1 + \frac{M_f*V^2}{2*L_f*K_f}\right\} + 2*K_r*I*s \quad (52)$$

[Equation 53]

$$F12 = 0 \quad (53)$$

[Equation 54]

$$F21 = \quad (54)$$
$$-4*M*V*t*L_r*K_f*K_r + 4*t*K_f*K_r*(M*L_f*L_r - I)*s$$

[Equation 55]

$$F22 = \frac{4*L^2*K_f*K_r}{V} - 2*M*V*(L_f*K_f - L_r*K_r) + \quad (55)$$
$$2*\{I*(K_f+K_r) + M*(L_f^2*K_f + L_r^2*K_r)\}*s + M*I*V*s^2$$

(E) Control of Steering Reaction Torque T and Yaw Rate γ using EPS Torque $T_{eps}$ and Front-wheel Left-right Braking/Driving Force Difference $F_f$ In this case, a relation between ($T_{eps}$ and $F_f$) and (T and γ) is expressed as the following equation (57) via the following equation (56).

[Equation 56]

$$\begin{bmatrix} \gamma \\ T \end{bmatrix} = G * \begin{bmatrix} F_f \\ T_{eps} \end{bmatrix} \quad (56)$$

[Equation 57]

$$\begin{bmatrix} F_f \\ T_{eps} \end{bmatrix} = G^{-1} * \begin{bmatrix} \gamma \\ T \end{bmatrix} \quad (57)$$

Here, the matrix G is expressed as the following equation (58).

[Equation 58]

$$G = \frac{1}{\det(A)} * \begin{bmatrix} G11 & G12 \\ G21 & G22 \end{bmatrix} \quad (58)$$

Moreover, the matrix coefficients G11, G12, G21 and G22 of the matrix G are expressed by the following equations (59) to (62), respectively.

[Equation 59]

$$G11 = -t_f*(K_f+K_r) - \frac{M*V*t_f}{2}*s \quad (59)$$

[Equation 60]

$$G12 = 0 \quad (60)$$

[Equation 61]

$$G21 = -t_f*(M*V*t*K_f - 2*t*L*K_f*K_r) + \quad (61)$$
$$M*t*t_f*L_f*K_f*s + k*\det(A)$$

[Equation 62]

$$G22 = \frac{4*L^2*K_f*K_r}{V} - 2*M*V*(L_f*K_f - L_r*K_r) + \quad (62)$$
$$2*\{I*(K_f+K_r) + M*(L_f^2*K_f + L_r^2*K_r)\}*s + M*I*V*s^2$$

(F) Control of Steering Reaction Torque T and Slip Angle β Using EPS Torque $T_{eps}$ and Front-Wheel Left-Right Braking/Driving Force Difference $F_f$ In this case, a relation between ($T_{eps}$ and $F_t$) and (T and β) is expressed as the following equation (64) via the following equation (63).

[Equation 63]

$$\begin{bmatrix} \beta \\ T \end{bmatrix} = H * \begin{bmatrix} F_f \\ T_{eps} \end{bmatrix} \quad (63)$$

[Equation 64]

$$\begin{bmatrix} F_f \\ T_{eps} \end{bmatrix} = H^{-1} * \begin{bmatrix} \beta \\ T \end{bmatrix} \quad (64)$$

Here, the matrix H is expressed as the following equation (65).

[Equation 65]

$$H = \frac{1}{\det(A)} * \begin{bmatrix} H11 & H12 \\ H21 & H22 \end{bmatrix} \quad (65)$$

Moreover, the matrix coefficients H11, H12, H21 and H22 of the matrix H are expressed by the following equations (66) to (69), respectively.

[Equation 66]

$$H11 = \frac{t_f}{2} * \left\{ M * V + \frac{2}{V} * (L_f * K_f - L_r * K_r) \right\} \quad (66)$$

[Equation 67]

$$H12 = 0 \quad (67)$$

[Equation 68]

$$H21 = -t_f * (M * V * t * K_f - 2 * t * L * K_f * K_r) + \\ M * t * t_f * L_f * K_f * s + k * \det(A) \quad (68)$$

[Equation 69]

$$H22 = \frac{4 * L^2 * K_f * K_r}{V} - 2 * M * V * (L_f * K_f - L_r * K_r) + \\ 2 * \{I * (K_f + K_r) + M * (L_f^2 * K_f + L_r^2 * K_r)\} * s + M * I * V * s^2 \quad (69)$$

(G) Control of Steering Reaction Torque T and Yaw Rate γ Using EPS Torque $T_{eps}$ And Rear-Wheel Left-Right Braking/Driving Force Difference $F_r$.

In this case, a relation between ($T_{eps}$ and $F_r$) and (T and γ) is expressed as the following equation (71) via the following equation (70).

[Equation 70]

$$\begin{bmatrix} \gamma \\ T \end{bmatrix} = J * \begin{bmatrix} F_r \\ T_{eps} \end{bmatrix} \quad (70)$$

[Equation 71]

$$\begin{bmatrix} F_r \\ T_{eps} \end{bmatrix} = J^{-1} * \begin{bmatrix} \gamma \\ T \end{bmatrix} \quad (71)$$

Here, the matrix J is expressed as the following equation (72).

[Equation 72]

$$J = \frac{1}{\det(A)} * \begin{bmatrix} J11 & J12 \\ J21 & J22 \end{bmatrix} \quad (72)$$

Moreover, the matrix coefficients J11, J12, J21 and J22 of the matrix J are expressed by the following equations (73) to (76), respectively.

[Equation 73]

$$J11 = -t_r * (K_f + K_r) - \frac{M * V * t_r}{2} * s \quad (73)$$

[Equation 74]

$$J12 = 0 \quad (74)$$

[Equation 75]

$$J21 = -t_r * (M * V * t * K_f - 2 * t * L * K_f * K_r) + M * t * t_r * L_f * K_f * s \quad (75)$$

[Equation 76]

$$J22 = \frac{4 * L^2 * K_f * K_r}{V} - 2 * M * V * (L_f * K_f - L_r * K_r) + \\ 2 * \{I * (K_f + K_r) + M * (L_f^2 * K_f + L_r^2 * K_r)\} * s + M * I * V * s^2 \quad (76)$$

(H) Control of Steering Reaction Torque T and Slip Angle β Using EPS Torque $T_{eps}$ and Rear-wheel Left-right Braking/Driving Force Difference $F_r$.

In this case, a relation between ($T_{eps}$ and $F_r$) and (T and β) is expressed as the following equation (78) via the following equation (77).

[Equation 77]

$$\begin{bmatrix} \beta \\ T \end{bmatrix} = K * \begin{bmatrix} F_r \\ T_{eps} \end{bmatrix} \quad (77)$$

[Equation 78]

$$\begin{bmatrix} F_r \\ T_{eps} \end{bmatrix} = K^{-1} * \begin{bmatrix} \beta \\ T \end{bmatrix} \quad (78)$$

Here, the matrix K is expressed as the following equation (79).

[Equation 79]

$$K = \frac{1}{\det(A)} * \begin{bmatrix} K11 & K12 \\ K21 & K22 \end{bmatrix} \quad (79)$$

Moreover, the matrix coefficients K11, K12, K21 and K22 of the matrix K are expressed by the following equations (80) to (83), respectively.

[Equation 80]

$$K11 = \frac{t_r}{2} * \left\{ M * V + \frac{2}{V} * (L_f * K_f - L_r * K_r) \right\} \quad (80)$$

-continued

[Equation 81]
$$K12 = 0 \quad (81)$$

[Equation 82]
$$K21 = \\ -t_r*(M*V*I*K_f - 2*I*L*K_f*K_r) + M*I*t_r*L_f*K_f*s \quad (82)$$

[Equation 83]
$$K22 = \frac{4*L^2*K_f*K_r}{V} - 2*M*V*(L_f*K_f - L_r*K_r) + \\ 2*\{I*(K_f+K_r) + M*(L_f^2*K_f + L_r^2*K_r)\}*s + M*I*V*s^2 \quad (83)$$

In each of the cases (A) to (H) described above, the value of the state controlled variable, which is to realize the desired trajectory following control and the steering reaction torque control coordinated therewith, can be obtained by substituting the target value for the vehicle state quantity. The drive control of the EPS actuator 500 and the selected device (the VGRS actuator 400, the ARS actuator 800, or the driving force distributing apparatus 300) enables the vehicle motion to be preferably controlled.

Incidentally, in the embodiments described above, an explanation was given to the trajectory following control in cases where one or both of the VGRS actuator 400 and the ARS actuator 800 are in the function restricted state, as the "case where the behavior control needs to be performed by one apparatus". However, the necessity for performing the behavior control can arise not only for the reason of the function restricted state but also for many reasons. The present invention is to define the control method for optimally maintaining the vehicle behavior in cases where the necessity arises. The reason why the necessity arises does not influence an effect of the present invention.

The present invention is not limited to the aforementioned embodiments, but various changes may be made, if desired, without departing from the essence or spirit of the invention which can be read from the claims and the entire specification. A vehicle motion control apparatus, which involves such changes, is also intended to be within the technical scope of the present invention.

INDUSTRIAL APPLICABILITY

The present invention can be used, for example, for a vehicle having a function for making the vehicle follow the target driving route.

DESCRIPTION OF REFERENCE CODES

FL, FR, RL, RR wheel
10 vehicle
11 propeller shaft
12 steering wheel
13 upper steering shaft
14 lower steering shaft
15 rack bar
16 steering wheel angle sensor
17 steering torque sensor
100 ECU
200 engine
300 driving force distributing apparatus
310 center differential mechanism
320 front differential mechanism
330 rear differential mechanism
400 VGRS actuator
500 EPS actuator
600 ECB
610 brake actuator
620FL, 620FR, 620RL, 620RR braking apparatus
800 ARS actuator

The invention claimed is:

1. A vehicle motion control apparatus which is configured to control a motion of a vehicle,
the vehicle comprising a plurality of apparatuses, each of which is configured to selectively control a slip angle or a yaw rate,
said vehicle motion control apparatus comprising:
a controller which is configured to set a target slip angle as a target value of the slip angle, set a target yaw rate as a target value of the yaw rate, perform behavior control in which the plurality of apparatuses are controlled such that the slip angle and the yaw rate are the set target slip angle and the target yaw rate, respectively, specify a turning state quantity of the vehicle, select at least one of the slip angle and the yaw rate to be prioritized, on the basis of the specified turning state quantity in a case where the behavior control needs to be performed by one of the plurality of apparatuses and control the one apparatus such that the selected one has the target value corresponding to the selected one, in the case where the behavior control needs to be performed by the one apparatus.

2. The vehicle motion control apparatus according to claim 1, wherein
the plurality of apparatuses include a first apparatus and a second apparatus, each of which is configured to selectively control the slip angle or the yaw rate,
said controller is further configured to determine whether or not at least one of the first and second apparatuses is in a function restricted state, select the one to be prioritized in a case where it is determined that the first or second apparatus is in the function restricted state, as the case where the behavior control needs to be performed by the one apparatus, and control one of the first and second apparatuses which is not in the function restricted state, as the one apparatus, such that the selected one has the target value corresponding to the selected one.

3. The vehicle motion control apparatus according to claim 2, wherein
the first apparatus is a front-wheel steering angle varying apparatus which is configured to change a front-wheel steering angle, independently of a driver's operation which promotes a change in the front-wheel steering angle, and
the second apparatus is a rear-wheel steering angle varying apparatus which is configured to change a rear-wheel steering angle, independently of a driver's operation which promotes a change in the rear-wheel steering angle.

4. The vehicle motion control apparatus according to claim 2, wherein
the plurality of apparatuses further include a third apparatus which is different from the first and second apparatus, each of which is configured to selectively control the slip angle or the yaw rate, and
said controller is further configured to control the third apparatus such that the selected one has the target value corresponding to the selected one if both the first and second apparatuses are in the function restricted state.

5. The vehicle motion control apparatus according to claim 4, wherein the third apparatus is a braking/driving force varying apparatus which is configured to change a front-wheel or rear-wheel left-right braking/driving force difference.

6. The vehicle motion control apparatus according to claim 2, wherein the function restricted state includes at least one of a failure state and a state in which selection of controlled variables is restricted.

7. The vehicle motion control apparatus according to claim 1, wherein said controller is further configured to specify degree of turning of the vehicle as the turning state quantity.

8. The vehicle motion control apparatus according to claim 7, wherein said controller is further configured to select the yaw rate as the one to be prioritized if the specified degree of turning is greater than or equal to a reference value, and select the slip angle as the one to be prioritized if the specified degree of turning is less than the reference value.

9. The vehicle motion control apparatus according to claim 1, wherein said controller is configured to specify a change rate of degree of turning of the vehicle as the turning state quantity.

10. The vehicle motion control apparatus according to claim 9, wherein said controller is configured to select the yaw rate as the one to be prioritized if the specified change rate of degree of turning is greater than or equal to a reference value, and select the slip angle as the one to be prioritized if the specified change rate of degree of turning is less than the reference value.

11. The vehicle motion control apparatus according to claim 1, wherein said controller is further configured to specify a steering characteristic of the vehicle as the turning state quantity.

12. The vehicle motion control apparatus according to claim 11, wherein said controller is further configured to select the yaw rate as the one to be prioritized if the specified steering characteristic corresponds to a strong under-steering state, and select the slip angle as the one to be prioritized if the specified steering characteristic does not correspond to the strong under-steering state.

13. The vehicle motion control apparatus according to claim 1, wherein said controller is further configured to specify a stability state quantity for defining degree of stability of vehicle behavior, and select the one to be prioritized on the basis of the specified stability sate quantity, in preference to the selection based on the turning state quantity.

14. The vehicle motion control apparatus according to claim 13, wherein said controller is further configured to specify the slip angle as the stability state quantity, and select the slip angle as the one to be prioritized if the specified slip angle is greater than or equal to a reference value.

15. The vehicle motion control apparatus according to claim 13, wherein said controller is further configured to specify degree of friction of a driving route as the stability state quantity, and select the slip angle as the one to be prioritized if the specified degree of friction is less than a reference value.

16. The vehicle motion control apparatus according to claim 1, wherein said controller is further configured to set the target slip angle such that the vehicle follows a target driving route, set the target yaw rate such that the vehicle follows the target driving route, perform, as the behavior control, trajectory following control in which the plurality of apparatuses are controlled such that the slip angle and the yaw rate are the target slip angle and the target yaw rate, respectively, each of which is set to follow the target driving route, the vehicle further comprises a steering reaction force control apparatus which is configured to control a steering reaction force, said controller is further configured to set a target steering reaction force as a target value of the steering reaction force, perform coordinated control in which the steering reaction force control apparatus is controlled such that the steering reaction force is the set target steering reaction force, cooperatively with the trajectory following control, continue the trajectory following control by controlling the one apparatus such that the selected one has the target value corresponding to the selected one, in the case where the behavior control needs to be performed by the one apparatus, and continue the coordinated control in a period in which the trajectory following control is continued.

17. The vehicle motion control apparatus according to claim 16, wherein said controller is further configured to determine whether or not a state of the vehicle corresponds to an allowable condition which is set t allow an end of the coordinated control in the period in which the coordinated control is continued, end the trajectory following control if it is determined that the state of the vehicle corresponds to the allowable condition, and end the coordinated control if it is determined that the state of the vehicle corresponds to the allowable condition.

18. The vehicle motion control apparatus according to claim 17, wherein the allowable condition includes a stop of the vehicle.

19. The vehicle motion control apparatus according to claim 16, wherein said controller is further configured to notify a driver that the behavior control needs to be performed by the one apparatus if the trajectory following control and the coordinated control are ended.

* * * * *